(12) United States Patent
Wilson et al.

(10) Patent No.: US 10,507,517 B2
(45) Date of Patent: Dec. 17, 2019

(54) FOUNDRY MEDIA FORMED FROM SLURRY DROPLETS AND METHODS OF USE

(71) Applicant: CARBO Ceramics Inc., Houston, TX (US)

(72) Inventors: Brett A. Wilson, Cypress, TX (US); Claude Krause, Saint Martinville, LA (US); Steve Canova, Toomsboro, GA (US); Keith Lew, Cypress, TX (US); Benjamin T. Eldred, Houston, TX (US); Clayton F. Gardinier, Houston, TX (US); Robert Duenckel, Colorado Springs, CO (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 15/844,243

(22) Filed: Dec. 15, 2017

(65) Prior Publication Data
US 2019/0184450 A1    Jun. 20, 2019

(51) Int. Cl.
| | |
|---|---|
| *B22C 9/02* | (2006.01) |
| *C04B 33/04* | (2006.01) |
| *C04B 33/32* | (2006.01) |
| *C04B 33/13* | (2006.01) |
| *C04B 35/10* | (2006.01) |
| *C04B 35/626* | (2006.01) |
| *C04B 35/628* | (2006.01) |

(Continued)

(52) U.S. Cl.
CPC ............... *B22C 9/02* (2013.01); *C04B 33/04* (2013.01); *C04B 33/131* (2013.01); *C04B 33/1305* (2013.01); *C04B 33/32* (2013.01); *C04B 35/10* (2013.01); *C04B 35/6263* (2013.01); *C04B 35/62695* (2013.01); *C04B 35/62802* (2013.01); *C04B 35/636* (2013.01); *C04B 38/00* (2013.01); *C04B 2235/349* (2013.01); *C04B 2235/5427* (2013.01); *C04B 2235/5472* (2013.01); *C04B 2235/6023* (2013.01); *C04B 2235/77* (2013.01); *C04B 2235/95* (2013.01); *C04B 2235/96* (2013.01); *C04B 2235/963* (2013.01); *C04B 2235/9607* (2013.01); *C04B 2235/9676* (2013.01)

(58) Field of Classification Search
CPC .................................. B22C 9/02; C04B 33/04
See application file for complete search history.

(56) References Cited

U.S. PATENT DOCUMENTS

| | | | |
|---|---|---|---|
| 3,963,818 | A | 6/1976 | Sakoda et al. |
| 4,352,390 | A | 10/1982 | Larson |

(Continued)

FOREIGN PATENT DOCUMENTS

| | | |
|---|---|---|
| CN | 101683691 A | 3/2010 |
| CN | 106747469 A | 5/2017 |

OTHER PUBLICATIONS

Mroczek, M et al., "Effects of Hot Sand and Its Cure by Use of a Sand Cooler: A Case Study", AFS Proceedings 2011; Figure 18.

(Continued)

*Primary Examiner* — Karl E Group
(74) *Attorney, Agent, or Firm* — Patterson + Sheridan, LLP

(57) ABSTRACT

A foundry media pellet includes a sintered ceramic material having a size from about 10 AFS GFN to about 110 AFS GFN, and a surface roughness of less than about 4 microns.

20 Claims, 17 Drawing Sheets

(51) Int. Cl.
*C04B 35/636* (2006.01)
*C04B 38/00* (2006.01)

(56) References Cited

U.S. PATENT DOCUMENTS

| | | | | |
|---|---|---|---|---|
| 4,427,068 | A | | 1/1984 | Fitzgibbon |
| 4,636,262 | A | | 1/1987 | Reed |
| 8,974,587 | B2 | * | 3/2015 | Howell .................. C04B 14/06 106/38.2 |
| 9,994,764 | B2 | * | 6/2018 | Howe ..................... C09K 8/80 |
| 2007/0099793 | A1 | * | 5/2007 | Wilson .................. C03C 10/00 501/118 |
| 2011/0100255 | A1 | * | 5/2011 | Kim ....................... B22C 1/188 106/38.35 |
| 2012/0118200 | A1 | * | 5/2012 | Howell .................. C04B 14/06 106/38.2 |
| 2016/0017214 | A1 | * | 1/2016 | Eldred .................... C09K 8/80 166/280.2 |
| 2016/0032177 | A1 | * | 2/2016 | Howe ..................... C09K 8/80 166/280.2 |
| 2017/0297087 | A1 | | 10/2017 | Rohrbacker et al. |

OTHER PUBLICATIONS

Conrad, C et al., "Determination of heat transfer coefficient and ceramic mold material parameters for alloy IN738LC Investment castins" Website [online]. Feb. 1, 2011. Retrieved Feb. 13, 2019. Retrieved from the Internet<URL:http://www.sciencedirect.com/science/article/pii/S0924013610002748>; Abstract.
International Search Report and Written Opinion dated Mar. 5, 2019 for Application No. PCT/US2018/065606.

* cited by examiner

FOUNDRY MEDIA FORMED FROM SLURRY DROPLETS AND METHODS OF USE

TECHNICAL FIELD

The present disclosure relates to foundry media. More particularly, the present disclosure relates to a slurry of finely-divided ceramic material that undergoes vibration-induced dripping from a nozzle to produce or form pellets of a sintered ceramic foundry media, along with methods for using the foundry media.

BACKGROUND

Foundry media is used in various casting processes in the metal casting industry. The function of the foundry media is as a backing, core, or molding media. The backing media is unbonded, supporting both internal and external areas of a preformed pattern; the core media is resin-bonded together and produces the internal open cavity of a casting; and the molding media is resin or clay-bonded and produces the external body of a casting. In such casting processes, molten metal is poured into a molded area in the presence of the foundry media to produce a casting of designed shape, size, and dimensions. As the molten metal is poured into the mold, the foundry media is heated and expands. When the metal and the mold cool to room temperature, the metal and the mold will contract. The expansion and contraction can result in defects in the resulting cast metal part.

The degree and rate of expansion that occurs can vary by the type of foundry media used. The coefficient of thermal expansion represents the amount a material will expand or contract upon heating or cooling. Foundry media with smaller coefficients of thermal expansion and a more linear rate of expansion will have less expansion (and more uniform) contraction during use as a molten metal mold, core, or backing material. This results in tighter dimensional tolerances and fewer defects in the final metal part.

Silica sand, the most common media used for metal casting applications, has a coefficient of thermal expansion of greater than ten ($10^{-6}$ inch per inch per $°$ C.). Silica sand also goes through multiple phase changes (e.g., alpha→beta→trydamite) when heated. These expansion properties can result in a high presence of expansion-related defects and additive costs to buffer or avoid these defects. Other known foundry media include a synthetic ceramic media commercially available from CARBO Ceramics Inc. under the tradename ACCUCAST®, which has a coefficient of thermal expansion of around 6.5 ($10^{-6}$ inch per inch per $°$ C.). Synthetic ceramic media also has a low linear expansion rate. These properties avoid expansion-related defects and various costly additives while enhancing dimensional precision and casting capability.

High thermal expansion properties can limit the ability to produce castings with thin walls or very complex parts that require high levels of dimensional precision. Foundry media with high thermal expansion properties may require additives to buffer the foundry media expansion or high machining and cleaning costs to correct for poor cast properties. Foundry media having lower thermal expansion properties can benefit the foundry industry through: (1) reduced casting defects; (2) reduced pre-engineering costs; (3) enhanced thin-wall capabilities; (4) enhanced capabilities for producing castings of high complexity; (5) reduced use of high-cost expansion buffer additives; (6) reduced use of costly and time consuming washes and their associated equipment and workers; (7) reduced cleaning and machining time and cost associated with cleaning or correcting the final cast products; and (8) reduced scrapped casting.

While synthetic ceramic media that are commercially available have lower thermal expansion properties, they can have some disadvantages when making chemically-bonded cores and molds using a resin. Certain resin materials are oftentimes used as coatings on the foundry media grains to bond the foundry media grains together with sufficient strength for retaining the core and mold shape after the core and mold package have been formed therefrom. The strength of the formed cores and molds plays a role in retaining shape and dimensional tolerance while the molten metal fills all cored and mold cavities. The amount of resin required to coat the foundry media such that the foundry media has sufficient strength to retain its shape once molded has an influence on the overall cost of the molding operation. While a higher level of resin can be used to increase the strength of the mold, this will not only increase costs, but can result in degradation of the metal casting. During the metal casting, the resin in the core and mold package gets heated by the molten metal to such a point that the polymer becomes a gas and "burns out". In addition, the extra gas created from the extra resin can exceed the permeability between the foundry media grains such that the gas cannot "escape" and will remain at the metal/mold surface, resulting in a defect in the cooled cast metal surface or will become entrapped in the metal, weakening the metal, creating a potential failure point in the final metal casting.

What is needed, therefore, is a synthetic foundry media that has a low coefficient of thermal expansion and minimizes the amount of resin applied thereto.

BRIEF SUMMARY OF THE INVENTION

A foundry media pellet is disclosed. The pellet includes a sintered ceramic material having a size from about 10 AFS GFN to about 110 AFS GFN, and a surface roughness of less than about 4 microns.

A method for forming a foundry media pellet is also disclosed. The method includes causing a slurry to flow through one or more nozzles that separate the slurry into a plurality of droplets. The droplets of slurry fall into a liquid and react with the liquid to form pellets. The pellets are formed into a mold after the pellets are coated with the resin. The pellets include a sintered ceramic material having a size from about 10 AFS GFN to about 110 AFS GFN and a surface roughness of less than about 4 microns.

BRIEF DESCRIPTION OF THE DRAWINGS

The present invention may best be understood by referring to the following description and accompanying drawings that are used to illustrate embodiments of the invention. In the drawings.

DETAILED DESCRIPTION

Foundry media and methods for making foundry media are described herein. The foundry media can include substantially spherical, sintered, ceramic pellets formed from calcined, partially calcined, or uncalcined kaolin clay, diaspore clay, burley clay, flint clay, fly ash, bauxite and alumina, or mixtures thereof. In one or more embodiments, the foundry media can be made from any suitable aluminosilicate material that can form into substantially spherical pellets, and that can be dried and sintered to form a final pellet having desired properties, such as those described herein. The pellets may be or include a sintered ceramic material having a size from about 10 AFS GFN (American Foundry Society Grain Fineness Number) to about 110 AFS GFN or from about 30 AFS GFN to about 80 AFS GFN. The pellets may have an average largest pore size of less than about 50 microns, less than about 40 microns, less than about 30 microns, less than about 20 microns, or less than about 10 microns.

When compared with pellets formed by conventional systems and methods, the pellets described herein may have a reduced bead porosity, surface smoothness, and well-rounded shape, which may reduce surface dust, thereby reducing resin requirements. Surface dust also promotes bead fusion points, potential burn-on to the metal surface, and can become airborne with the movement of the pellets.

Figure 1:
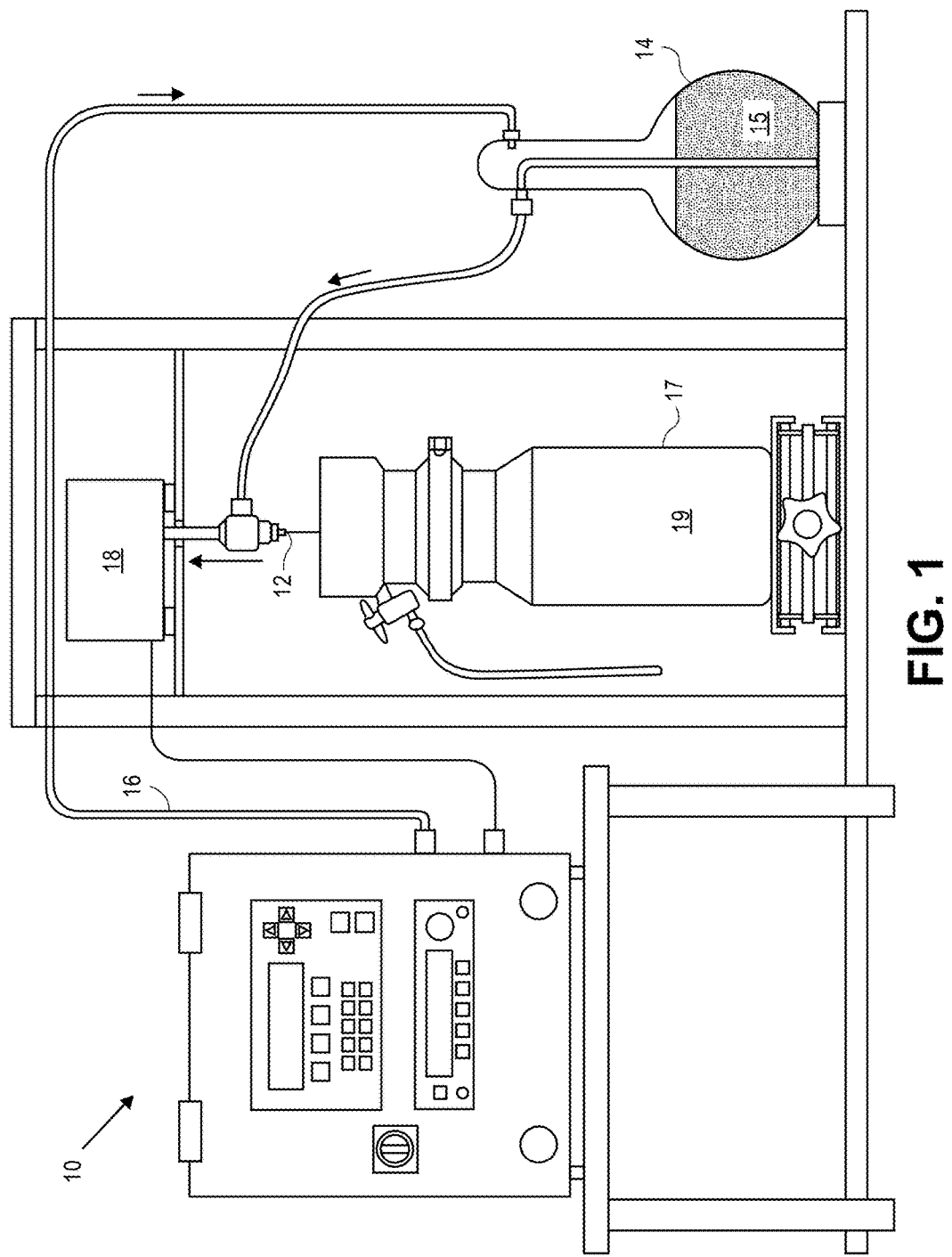
FIG. 1 is a schematic view of an apparatus for forming pellets made of a foundry media.

FIG. 1 shows an apparatus 10 for forming pellets made from the foundry media. The apparatus 10 may include one or more nozzles 12 (one is shown). As described below, the apparatus 10 may be used to perform at least a portion of a method commonly called "drip casting." The nozzle 12 may receive a slurry 15 from a feed tank 14, which contains ceramic raw materials suspended in water. Pressure may be applied to the feed tank 14 by a pressure supply system 16, which causes the slurry 15 to flow through the nozzle 12 at a selected rate (e.g., a laminar flow). The rate may be from about 1 kg/(mm$^2$×hr) to about 15 kg/(mm$^2$×hr). In addition, a vibrator unit 18 may be connected to the nozzle 12 and is used to supply pressure pulses to the nozzle 12 or directly into the slurry 15 flowing to the nozzle 12. The resulting vibration of the slurry 15 flowing through the nozzle 12 causes the slurry 15 exiting the nozzle 12 to break into droplets of substantially uniform size.

A coagulation vessel 17 may be positioned below the nozzle 12, and the coagulation vessel 17 may receive droplets of the slurry 15 after they pass through the nozzle 12. As the droplets fall toward the coagulation vessel 17, surface tension effects may cause the droplets to form into a substantially spherical shape. The substantially spherical shape may be formed without a sol-gel reaction, a reaction gas-free fall zone, a foamed layer of reaction liquid, or a reaction liquid directed onto the droplets prior to entering a reaction liquid 19 in the coagulation vessel 17.

Figure 2:
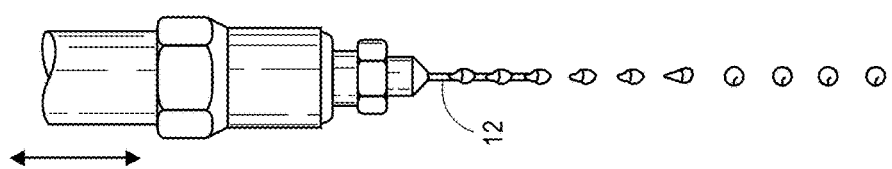
FIG. 2 is a schematic view showing a single nozzle of the apparatus forming droplets from a slurry stream that may subsequently be formed into the pellets by the apparatus.

FIG. 2 shows the nozzle 12 having the slurry 15 flowing therethrough and forming into the droplets. The distance of the fall (e.g., between the nozzle 12 and the coagulation vessel 17) may be selected to be great enough to allow the droplets to become substantially spherical before entering the liquid 19 in the coagulation vessel 17.

The slurry 15 from the feed tank 14 may contain (1) a finely ground (e.g., 0.01-50 microns in size) mineral or processed powder capable of producing a strong ceramic material after sintering, (2) a dispersant for keeping the solid particles in the slurry 15 well separated, (3) water, and (4) a reactant that reacts with a component in the liquid 19 in the coagulation vessel 17 to form a semi-solid or insoluble compound. The solids content of the slurry 15 may be from about 15 wt % to about 65 wt % or about 25 wt % to about 75 wt %. The viscosity of the slurry 15 may be from about 1 centiPoise to about 1,000 centiPoise, but may be higher. Lower viscosity of the slurry 15 may aid in improving droplet formation and formation of spherical pellets. Optimization of the dispersant type and concentration may reduce viscosity. Dispersants may be selected based on cost, availability, and effectiveness in reducing the viscosity of the slurry 15. The dispersants that may be used to reduce the viscosity of the slurry 15 include sodium silicate, ammonium polyacrylate, sodium polymethacrylate, sodium citrate, sodium polysulfonate, and hexametaphosphate.

The reactant chemical in the slurry 15 in the feed tank 14 may be sodium alginate. This is a naturally-occurring polysaccharide that is soluble in water as the sodium salt but is cross-linked to form a gel as the calcium salt. Alginate may be added to the slurry 15 at levels of about 0.1% to about 1.0% (weight percent alginate solid to total slurry). The liquid 19 in the coagulation tank 17 may gel with the reactant chemical in the slurry 15. The liquid 19 for sodium alginate may be a calcium chloride solution at concentration levels of 0.5% to 10% by weight. A variety of reactants in the slurry 15 flowing through nozzle 12 and in the coagulation vessel 17 may be used. The reactants may include other polysaccharides and other cross-linking compounds such as polyvinyl alcohol or borate fluids.

The diameter of the nozzle 12, the viscosity of the slurry 15, the ceramic particle content of the slurry 15, the pressure to feed the slurry 15 to the nozzle 12, and/or the frequency and amplitude of vibration applied by the vibrator source 18 are adjusted to produce droplets having the desired size. These variables may be set at a constant value as the substantially spherical droplets are produced to subsequently form a batch of substantially spherical pellets of propping material. Different batches may be produced having different sized pellets. For example, each batch may be monosized (e.g., contained on a single sieve such as passing through a 40 mesh sieve but staying on a 45 mesh sieve). The pressure used to feed the slurry 15 to the nozzle 12 may be adjusted to create laminar flow through the nozzle 12. The feed pressure can range from about 1 psi to about 50 psi. The frequency may be adjusted for each set of slurry conditions such that a resonance is established in the slurry stream exiting the nozzle 12 that then produces the spherical droplets. The frequency can range from about 10 Hz to about 20,000 Hz. The pressure and frequency may be optimized iteratively to create uniform spherical droplets. The amplitude may be adjusted to improve the uniform shape of the spherical droplets. The flow rate of the slurry 15 through the nozzle 12 may be a function of the diameter of the nozzle 12, the slurry feed pressure, and the slurry properties such as viscosity and density. For example, for kaolin and bauxite slurries flowing through nozzles 12 up to 400 microns in diameter, the flow rate per nozzle 12 can range from 0.1 to 1 kg/hr.

The distance between the nozzle 12 and the top of the liquid 19 in the coagulation vessel 17 may be selected to allow the droplets to become substantially spherical before reaching the top of the liquid 19. The distance can be from about 1 cm to about 20 cm, or from about 1 cm to about 5 cm so as to reduce distortion of the droplet shape upon impact with the surface of the liquid 19, thereby eliminating the need for a reaction gas, a foam layer, or tangentially directed reaction liquid prior to the droplets entering the coagulation vessel 17. The reactant chemical(s) in the droplets of slurry 15 react with the liquid 19 in the coagulation vessel 17 to create a semi-solid surface on the droplets, thereby transforming the droplets into pellets. The semi-solid surface helps retain the spherical shape and prevents agglomeration of the pellets. The residence time of the pellets in the coagulation vessel 17 may be sufficient to allow the pellets to become rigid enough to prevent deformation of the spherical shape when they are removed and dried (i.e., in semi-rigid state). In some embodiments, the droplets may fall into the liquid 19, which may be flowing vertically upward so that settling of the droplets through the liquid 19 may be retarded to produce a longer residence time in the coagulation vessel 17. The pellets formed using the apparatus 10 may be washed to remove excess coagulation agents and conveyed to other devices where they may be dried and sintered.

Figure 3:
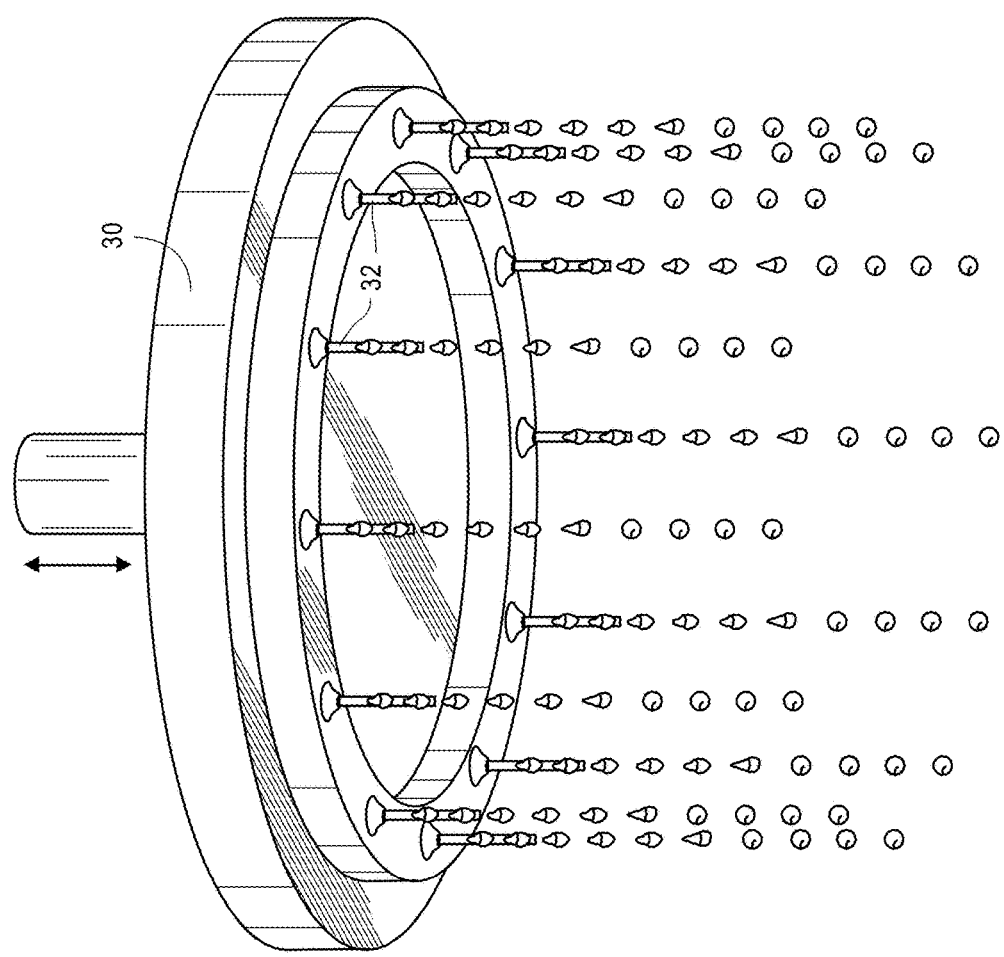
FIG. 3 is a schematic view showing a multi-nozzle plate forming droplets from a slurry stream that may subsequently be formed into the pellets by the apparatus.

FIG. 3 illustrates a multi-nozzle apparatus that may be used as an alternative to the single nozzle 12 shown in FIG. 2. The multi-nozzle apparatus may help apply the process on a commercial scale. Multiple nozzles 32 are placed in a vessel 30, which operates under a controlled pressure to flow the slurry 15 through the nozzles 32. The vessel 30 may be vibrated to vibrate the nozzles 32, as described above. Alternatively, variable pressure may be induced in the slurry 15 to cause formation of uniform-sized droplets. The droplets may be collected as described above.

The pellets produced by the process described in FIGS. 1-3 are near uniform in size. For example, Table 1 below compares the pellet size distributions for sintered kaolin foundry media produced by a conventional dry mixing process and by the drip casting process described herein, without screening of green pellets. As used herein, "green pellets" refers to dried pellets including the starting ceramic raw materials, which have not yet been heated in a kiln to sinter them. Without screening of the green pellets, dry mixing produces fired foundry media with a distribution across six screens, whereas drip casting produces fired foundry media substantially on one screen. Therefore, in a manufacturing process for foundry media, drip casting does not require sieving the green pellets to select the size range desired and then recycling the material in green pellets outside the selected size range. The size of the pellets to be sintered into foundry media may be selected by controlling the diameter of the nozzle(s) 12, 32, the viscosity of the slurry 15, the ceramic particle content of the slurry 15, the pressure to feed the slurry 15 to the nozzle(s) 12, 32, the frequency and amplitude of vibration applied by the vibrator source 17, or a combination thereof. The sintered pellets of foundry media produced by the process described in FIGS. 1-3 can have any suitable size. In one example, the sintered pellets of foundry media produced by the process described in FIGS. 1-3 can have a size of at least about 100 mesh, at least about 80 mesh, at least about 60 mesh, at least about 50 mesh, or at least about 40 mesh. In another example, the sintered pellets of foundry media can have a size from about 2 mesh to about 115 mesh, about 3 mesh to about 100 mesh, about 5 mesh to about 80 mesh, about 10 mesh to about 80 mesh, about 12 mesh to about 60 mesh, about 14 mesh to about 50 mesh, about 16 mesh to about 40 mesh, or about 18 mesh to about 35 mesh.

TABLE 1

Sieve Distribution of Sintered Pellets (Foundry Media) Formed by Dry Mixing and Drip Casting

|  | 16 Mesh | 20 Mesh | 25 Mesh | 30 Mesh | 35 Mesh | 40 Mesh | 50 Mesh | Pan |
|---|---|---|---|---|---|---|---|---|
| Dry Mixing | 0% | 17.8% | 23.9% | 24.3% | 18.4% | 10.6% | 4.9% | 0% |
| Drip Casting | 0% | 0% | 0.2% | 99.8% | 0% | 0% | 0% | 0% |

The foundry media produced by the process described in FIGS. 1-3 can have any suitable composition. The foundry media can be or include silica and/or alumina in any suitable amounts. According to one or more embodiments, the foundry media may include less than 80 wt %, less than 60 wt %, less than 40 wt %, less than 30 wt %, less than 20 wt %, less than 10 wt %, or less than 5 wt % silica based on the total weight of the foundry media. For example, the foundry media may include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to one or more embodiments, the foundry media may include at least about 30 wt %, at least about 50 wt %, at least about 60 wt %, at least about 70 wt %, at least about 80 wt %, at least about 90 wt %, or at least about 95 wt % alumina based on the total weight of the foundry media. For example, the foundry media may include from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina. In one or more embodiments, the foundry media produced by the process described in FIGS. 1-3 can include alumina, bauxite, kaolin, or any mixture thereof. For example, the foundry media can be composed entirely of or composed essentially of alumina, bauxite, or kaolin, or any mixture thereof. The term "kaolin" is well known in the art and can include a raw material having an alumina content of at least about 40 wt % on a calcined basis and a silica content of at least about 40 wt % on a calcined basis. The term "bauxite" is well known in the art and can be or include a raw material having an alumina content of at least about 55 wt % on a calcined basis.

The foundry media produced by the process described in FIGS. 1-3 can have any suitable specific gravity. In one example, the foundry media can have a specific gravity of at least about 2.5, at least about 2.7, at least about 3, at least about 3.3, or at least about 3.5. In another example, the foundry media can have a specific gravity from about 2.5 to about 4.0, about 2.7 to about 3.8, about 3.5 to about 4.2, about 3.8 to about 4.4, or about 3.0 to about 3.5.

The foundry media produced by the process described in FIGS. 1-3 can have any suitable surface roughness. In one example, the foundry media can have a surface roughness of less than 5 µm, less than 4 µm, less than 3 µm, less than 2.5 µm, less than 2 µm, less than 1.5 µm, or less than 1 µm. In another example, the foundry media can have a surface roughness from about 0.1 µm to about 4.5 µm, about 0.4 µm to about 3.5 µm, or about 0.8 µm to about 2.8 µm.

Figure 4A:
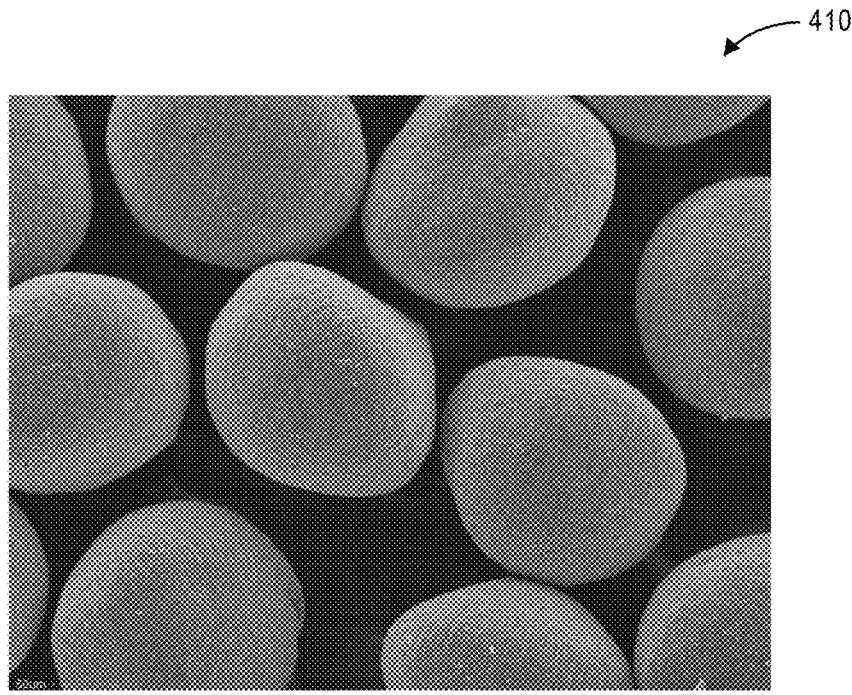
FIG. 4A shows a photograph of sintered bauxite pellets formed by the apparatus of FIG. 1. The photograph was taken by an optical microscope at 64X.
Figure 4B:
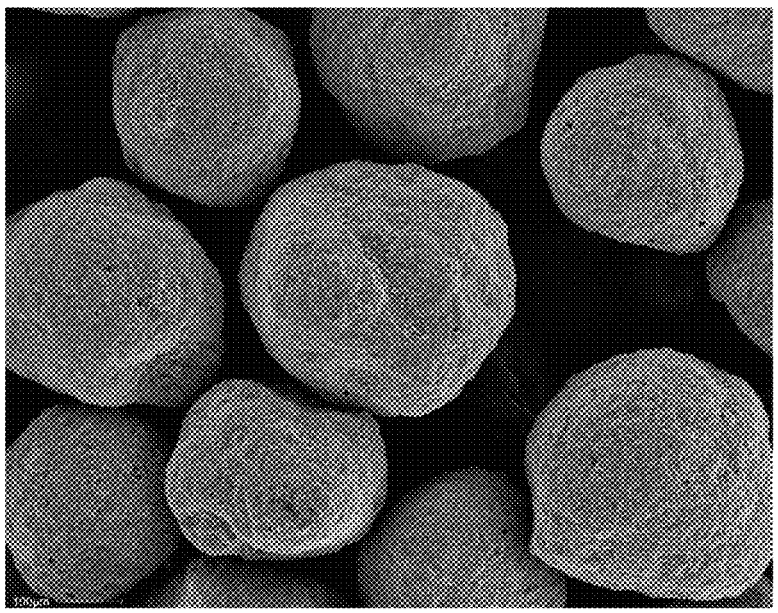
FIG. 4B shows a photograph of sintered bauxite pellets formed by a conventional apparatus and/or method. The photograph was taken by an optical microscope photograph at 52X.
Figure 4C:
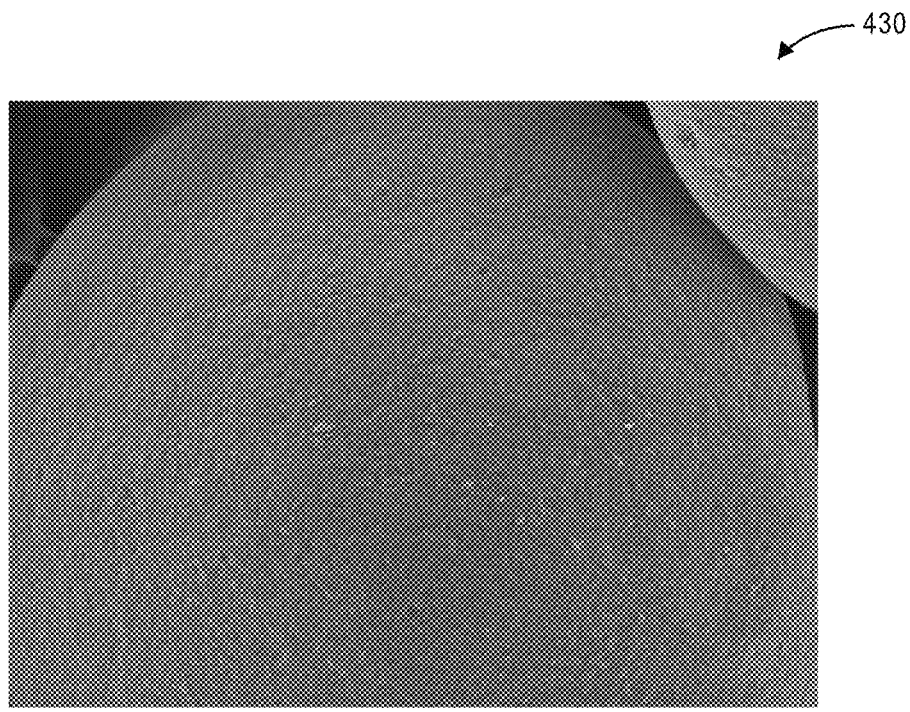
FIG. 4C shows a photograph of sintered pellets of kaolin formed by the apparatus of FIG. 1.
Figure 4D:
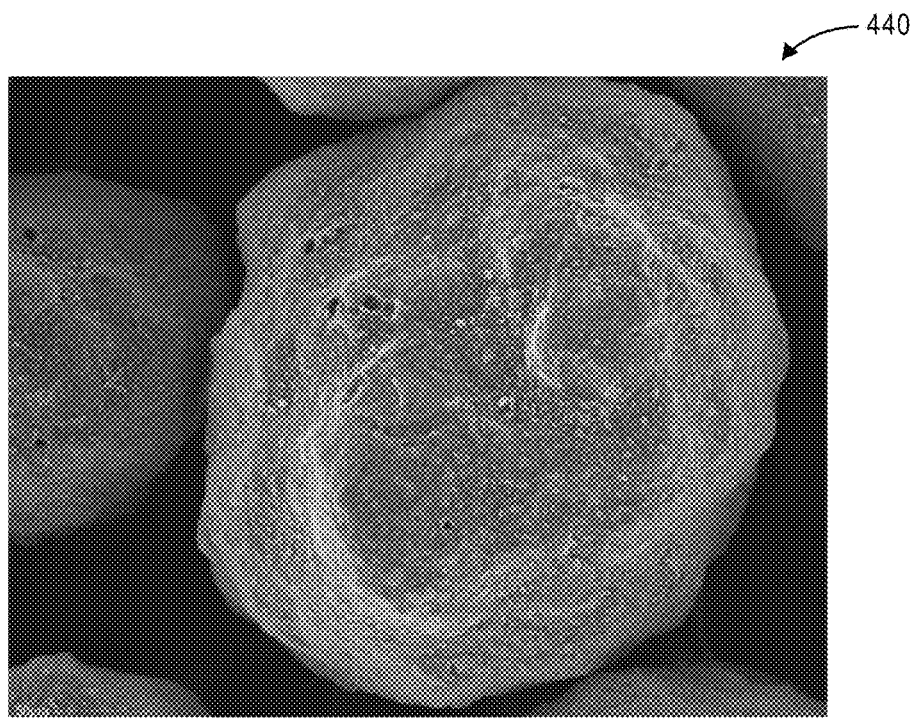
FIG. 4D shows a photograph of sintered pellets of kaolin formed by a conventional apparatus and/or method.

FIG. 4A shows a photograph 410 of sintered bauxite pellets formed by the apparatus 100 and the methods (e.g., drip casting) described herein. The photograph 410 was taken by an optical microscope at 64X and shows a smooth, round surface that may allow good resin adhesion to the surface of the pellets. FIG. 4B shows a photograph 420 of sintered bauxite pellets formed by a conventional apparatus and/or method. The photograph 420 was taken by an optical microscope photograph at 52X and shows a more irregular shape with a microscopically rougher surface than pellets from FIG. 4A that may take more resin to adequately coat the surface and bond the pellets together. FIG. 4C shows a photograph 430 of sintered pellets of kaolin formed by the apparatus 100 and the methods (e.g., drip casting) described herein which shows a surface that is smooth enough to yield a glossy surface and which may allow good adhesion of resin to the surface of the pellets. FIG. 4D shows a photograph 440 of sintered pellets of kaolin formed by a conventional apparatus and/or method which shows a more irregular shape with a microscopically rougher surface that may require more resin to adequately coat the surface and bond the pellets together than the pellets from FIG. 4C.

Figure 5A:
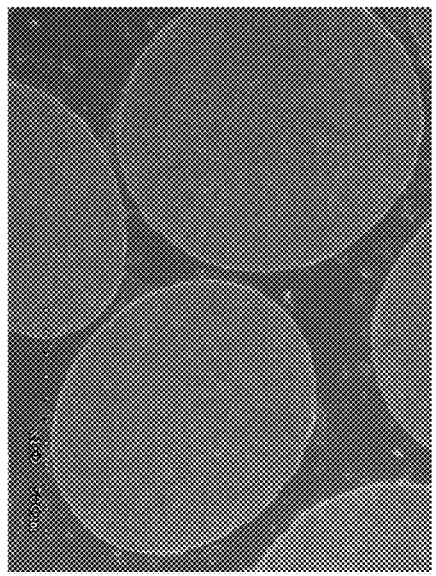
FIG. 5A shows a photograph of sintered pellets of bauxite formed by the apparatus of FIG. 1. The photograph was taken by a scanning electron microscope (SEM) at 100X.
Figure 5B:
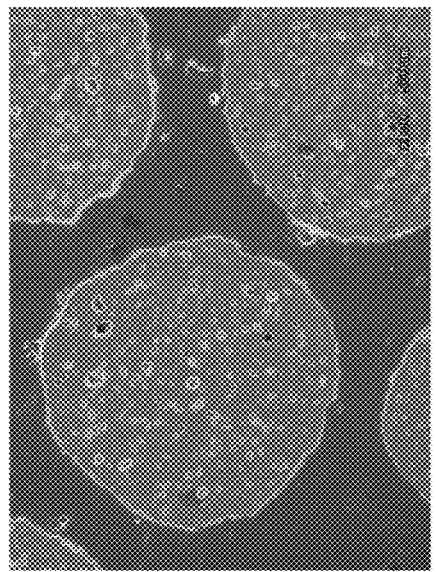
FIG. 5B shows a photograph of sintered pellets of bauxite formed by a conventional apparatus and/or method. The photograph was taken by a SEM at 100X.
Figure 5C:
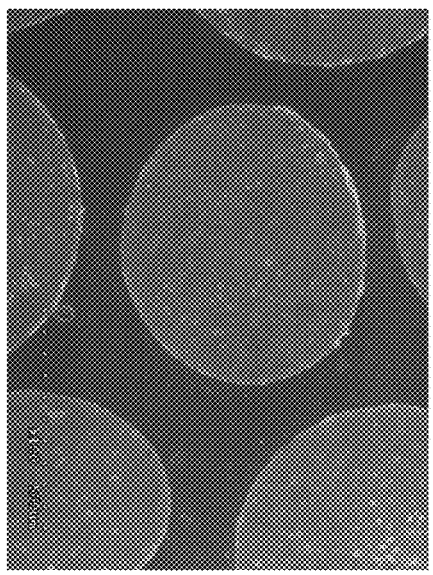
FIG. 5C shows a photograph of sintered pellets of kaolin formed by the apparatus of FIG. 1. The photograph was taken by a SEM at 100X.
Figure 5D:
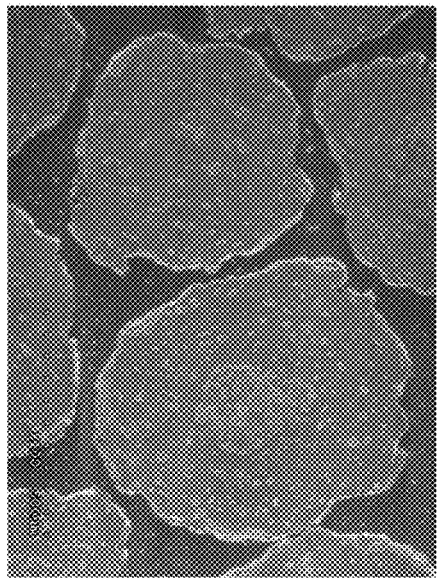
FIG. 5D shows a photograph of sintered pellets of kaolin formed by a conventional apparatus and/or method. The photograph was taken by a SEM at 100X.

FIG. 5A shows a photograph 510 of a bauxite foundry media formed by the apparatus 100 and the methods (e.g., drip casting) described herein. The foundry media in the photograph 510 has high sphericity and a very smooth surface. FIG. 5B shows a photograph 520 of a bauxite foundry media made by or formed in an Eirich mixer. The surfaces of the particles in the photograph 520 are rough and generally oblate. FIG. 5C shows a photograph 530 of a kaolin foundry media formed by the apparatus 100 and the methods (e.g., drip casting) described herein. The foundry media in FIG. 5C shows the smooth round surface that can be made using the methods described herein. FIG. 5D shows a photograph 540 of a kaolin foundry media made by a fluidized bed process. The foundry media in FIG. 5D has a very irregular microscopic surface.

The surface roughness of each whole foundry media shown in FIGS. 5A-5D was measured. A smooth, convex perimeter was drawn around each foundry media, establishing an average surface level that mimicked the actual foundry media surface as closely as possible while still remaining convex. Then, the separation between the actual surface and the smooth, average surface was measured around the entire perimeter at intervals of 100 µm at 100× magnification. The separation could be measured with a precision of about 0.5 µm. The average of the measurements from the entire perimeter is representative of the surface roughness of the foundry media. Table 2 below shows that foundry media formed by the conventional dry mixing and spray fluidized bed methods have a surface roughness from three to seven times as large as the drip cast method disclosed herein.

TABLE 2

Surface Roughness of Drip Cast and Conventionally-Formed Foundry Media (e.g., Sintered Pellets)

| | Average Surface Roughness (µm) |
|---|---|
| Drip Cast Bauxite (FIG. 5A) | 1.6 |
| Dry Mixing-Formed Bauxite (FIG. 5B) | 4.9 |
| Drip Cast Kaolin (FIG. 5C) | 0.8 |
| Spray Fluid Bed-Formed Kaolin (FIG. 5D) | 5.7 |

Figure 6:
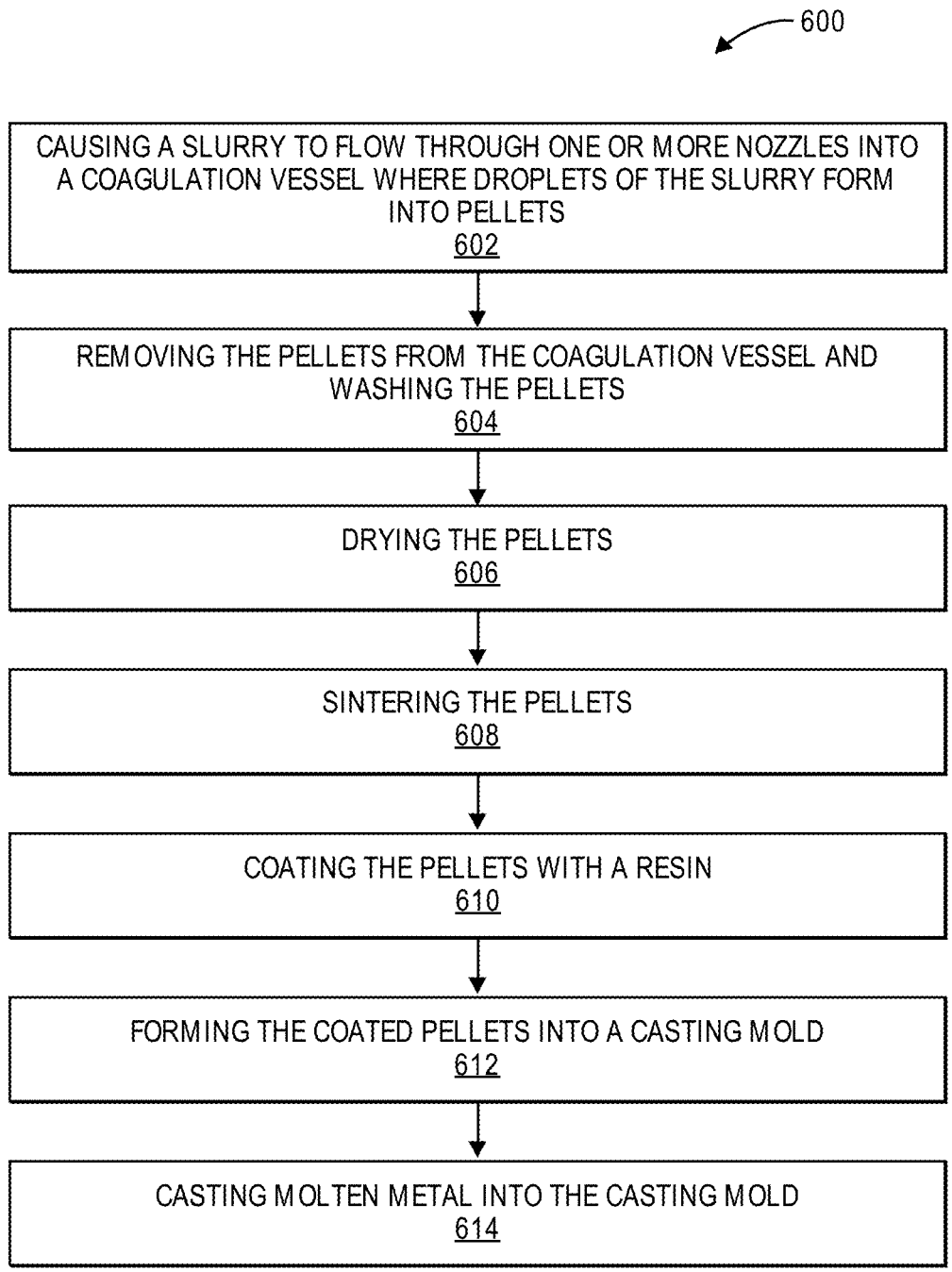
FIG. 6 shows a flowchart of a method for forming pellets made of a foundry media.

FIG. 6 shows a flowchart of a method 600 for forming pellets made of a foundry media. The method 600 may include increasing a pressure applied to the slurry 15 to cause the slurry 15 to flow through one or more nozzles 12, 32, as at 602. The slurry 15 may form into a plurality of droplets after passing through the nozzle(s) 12, 32 which is/are being vibrated up and down. The formed droplets then fall into the liquid 19 in the coagulation vessel 17. The droplets of slurry 15 may react with the liquid 19 in the coagulation vessel 17 to create a semi-solid surface on the droplets, thereby transforming the droplets into pellets. The method 600 may also include removing the pellets from the coagulation vessel 17 and washing the pellets (e.g., with water) to rinse the liquid 19 off of the pellets, as at 604. The method 600 may also include drying the pellets after washing the pellets, as at 606. The method 600 may also include sintering the pellets (e.g., after drying the pellets), as at 608.

After the pellets are sintered, the method 600 may include coating the pellets with a resin, as at 610. In at least one embodiment, the pellets may be coated with the resin in a mixer, which mixes the pellets and the resin together. The method 600 may also include forming the coated pellets into a casting mold, as at 612. The method 600 may also include casting molten metal into the casting mold, as at 614. The molten metal may cool in the casting mold to form a metal part in the shape of the mold.

Example 1

Testing was performed to evaluate the thermal expansion, surface viscosity, and specific heat capacity of three ceramic aggregate samples. The three samples received were:
Sample 1 (formed from kaolin by the apparatus of FIG. 1)
Sample 2 (formed from bauxite by the apparatus of FIG. 1)
Sample 3 (formed from a kaolin and bauxite blend by a conventional apparatus)

Sample 1 is a low density 35 mesh size (oilfield product). Sample 2 is a high density 25 mesh size (oilfield product). Sample 3 is an intermediate density 40 GFN (foundry product).

Dilatometry tests were run on the unbonded samples to a temperature of 1650° C. (3002° F.), to determine the thermal expansion characteristics of the samples. Alumina crucibles were used as sample containers for the unbonded samples. Surface viscosity was calculated from the thermal expansion results and was used to determine the sinter temperature of the samples. The differences in the expansion profile and sinter temperatures were observed and evaluated for the three samples.

Differential scanning calorimetry (DSC) was used to determine the specific heat capacity of the three samples. DSC tests were run from room temperature to 1450° C. (2642° F.) in a neutral atmosphere. 70 μL alumina crucibles were used as sample containers for the unbonded samples.

Thermal expansion tests were run using a high-temperature aggregate dilatometer. The unbonded samples measured 1.1" (28 mm) in diameter and 1.52" (38.6 mm) in height. The samples were heated to 1650° C. (3002° F.) at a heating rate of 15° C. per minute in a ceramic sample holder, and the resulting deformation was recorded. The tests were run in a neutral atmosphere. Surface viscosity results were obtained from linear expansion and are useful to describe the sintering characteristics of the samples.

The specific heat capacity of the samples was calculated using a high temperature Differential scanning calorimetry/thermo gravimetric analysis (DSC/TGA) unit. The unit is capable of measuring the heat flow, specific heat capacity, and sample weight of samples. The samples were run from room temperature to 1450° C. (2642° F.) at a temperature rate of 15° C./min. Alumina sample pans were used to withstand the high temperature. The tests were run in a neutral atmosphere.

Figure 7:
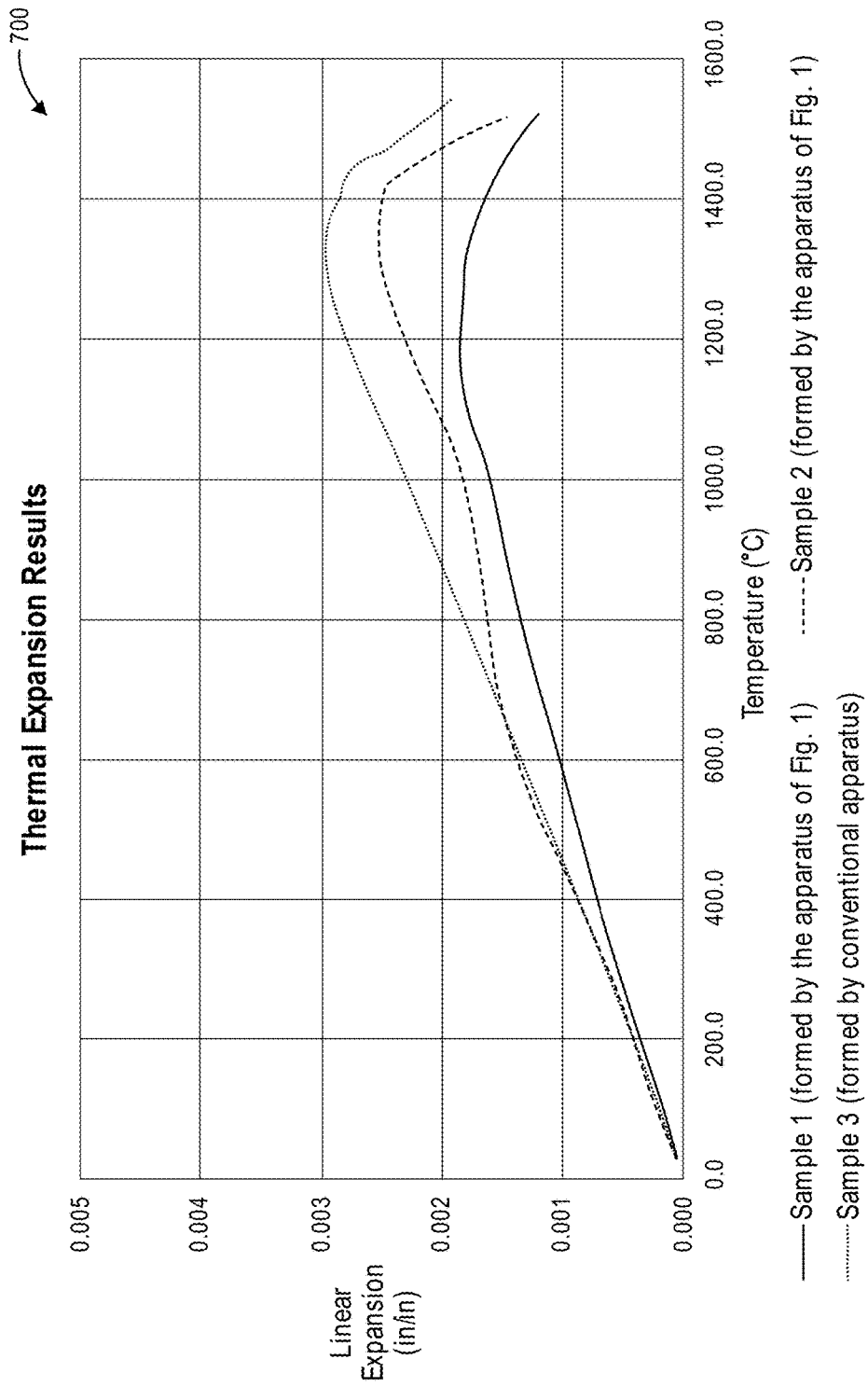
FIG. 7 is a graph showing thermal expansion results for three samples, according to an embodiment.

FIG. 7 is a graph 700 showing the thermal expansion results for the three samples, according to an embodiment. It can be observed that Samples 2 and 3 have similar expansion until about 700° C. (1292° F.). After this temperature, the Sample 2 can be observed to have a slightly lower expansion, when compared to Sample 3, until about 1400° C. (2552° F.), where the sample starts contracting slightly. Sample 3 was measured to have a steady expansion until about 1330° C. (2426° F.), before a contraction was observed. Both samples can be seen to have a similar rate of contraction at the end of the test.

In comparison, Sample 1 can be observed to have a lower overall expansion, when compared to the other two samples. Sample 1 expanded steadily from room temperature to about 1170° C. (2138° F.). The expansion was observed to remain constant with further increase in temperature from 1170° C. (2138° F.) to 1320° C. (2408° F.), at which point, the sample starts contracting slowly. When compared to Samples 2 and 3, Sample 1 was observed to have a lower rate of contraction at the end of the test. For example, Sample 1 had a thermal expansion of less than 0.002 in/in at 1200° C. and at 1400° C.

Figure 8:
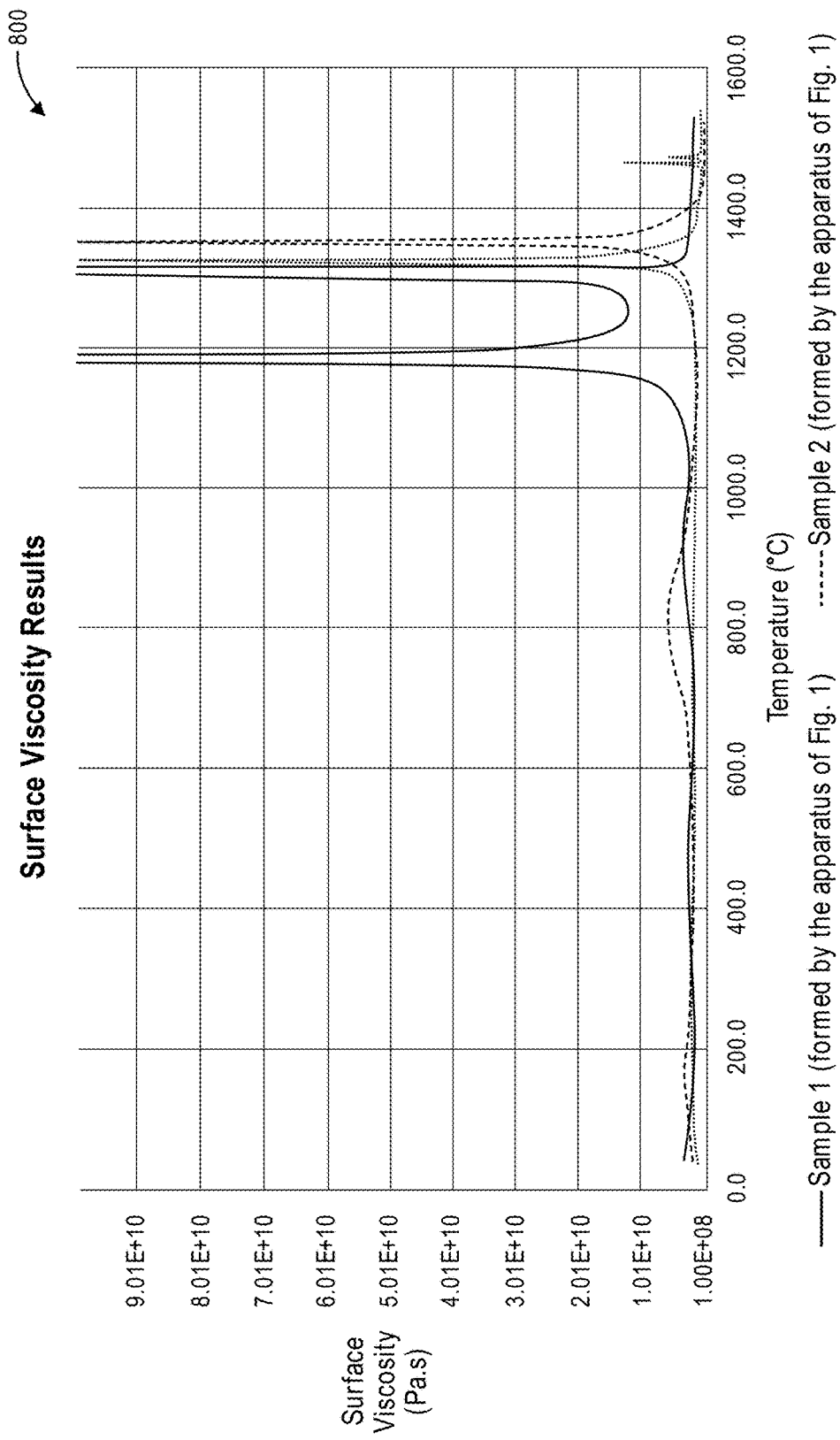
FIG. 8 is a graph showing surface viscosity results for the three samples in FIG. 7, according to an embodiment.

FIG. 8 is a graph 800 showing the surface viscosity results for the three samples in FIG. 7, according to an embodiment. As mentioned earlier, surface viscosity was calculated from the linear expansion results and is a measure of the movement of individual sand grains on the surface of the sample. It is also a reliable method to evaluate samples for high-temperature phase transitions and sinter points. The three samples can be observed to have similar surface viscosity until about 1100° C. (2012° F.). At this temperature, the viscosity of Sample 1 can be observed to increase rapidly through two different peaks. The first peak is greater than $4.01 \times 10^{10}$ Pa*s at less than 1200° C., and the second peak is greater than $4.01 \times 10^{10}$ Pa*s between about 1250° C. and about 1350° C. The first peak is believed to be a surface reaction that is occurring on the top of the sample, under a compression load. The second peak is used to calculate the sinter temperature of the sample. The peak surface viscosity of Sample 1 is greater than $1.015 \times 10^{12}$ Pa*s at a temperature that is less than 1325° C. Samples 2 and 3 can be observed to have a peak viscosity at slightly higher temperatures when compared to Sample 1.

Figure 9:
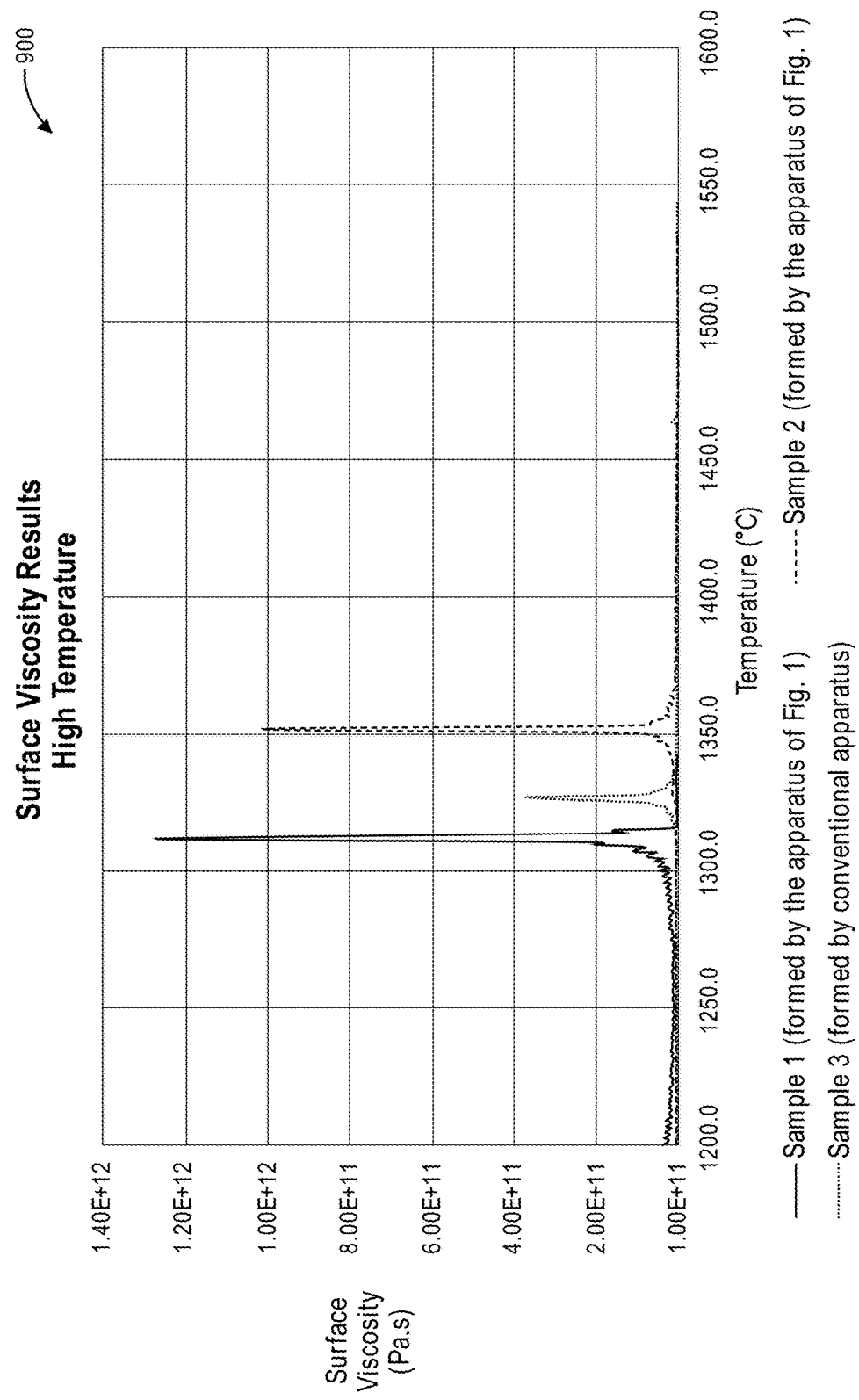
FIG. 9 is a graph showing viscosity results for the three samples (in FIG. 7) at higher temperatures, according to an embodiment.

FIG. 9 is a graph 900 showing the viscosity results for the three samples (in FIG. 7) at higher temperatures, according to an embodiment. It can be observed that the three samples have distinct peaks in viscosity, signifying the sinter temperature, at different temperatures. Samples 3 and 2 were observed to have peak viscosities of $3.65 \times 10^{11}$ Pa*s and $1.011 \times 10^{12}$ Pa*s respectively, with corresponding sinter temperatures of 1326° C. (2419° F.) and 1351° C. (2464° F.). In comparison, Sample 1 can be observed to have a higher peak viscosity of $1.254 \times 10^{12}$ Pa*s, when compared to the other two samples. However, a slightly lower sinter temperature of 1311° C. (2392° F.) was measured for Sample 1. The sinter temperature and peak viscosity at sinter temperature results for the three samples (e.g., ceramic aggregates) are shown in Table 3.

TABLE 3

| Sample ID | Sinter Temperature (° C.) | Peak Viscosity at Sinter Temperature (Pa * s) |
| --- | --- | --- |
| Sample 1 | 1311.0 | $1.254 \times 10^{12}$ |
| Sample 2 | 1350.7 | $3.650 \times 10^{11}$ |
| Sample 3 | 1326.2 | $1.011 \times 10^{12}$ |

Figure 10:
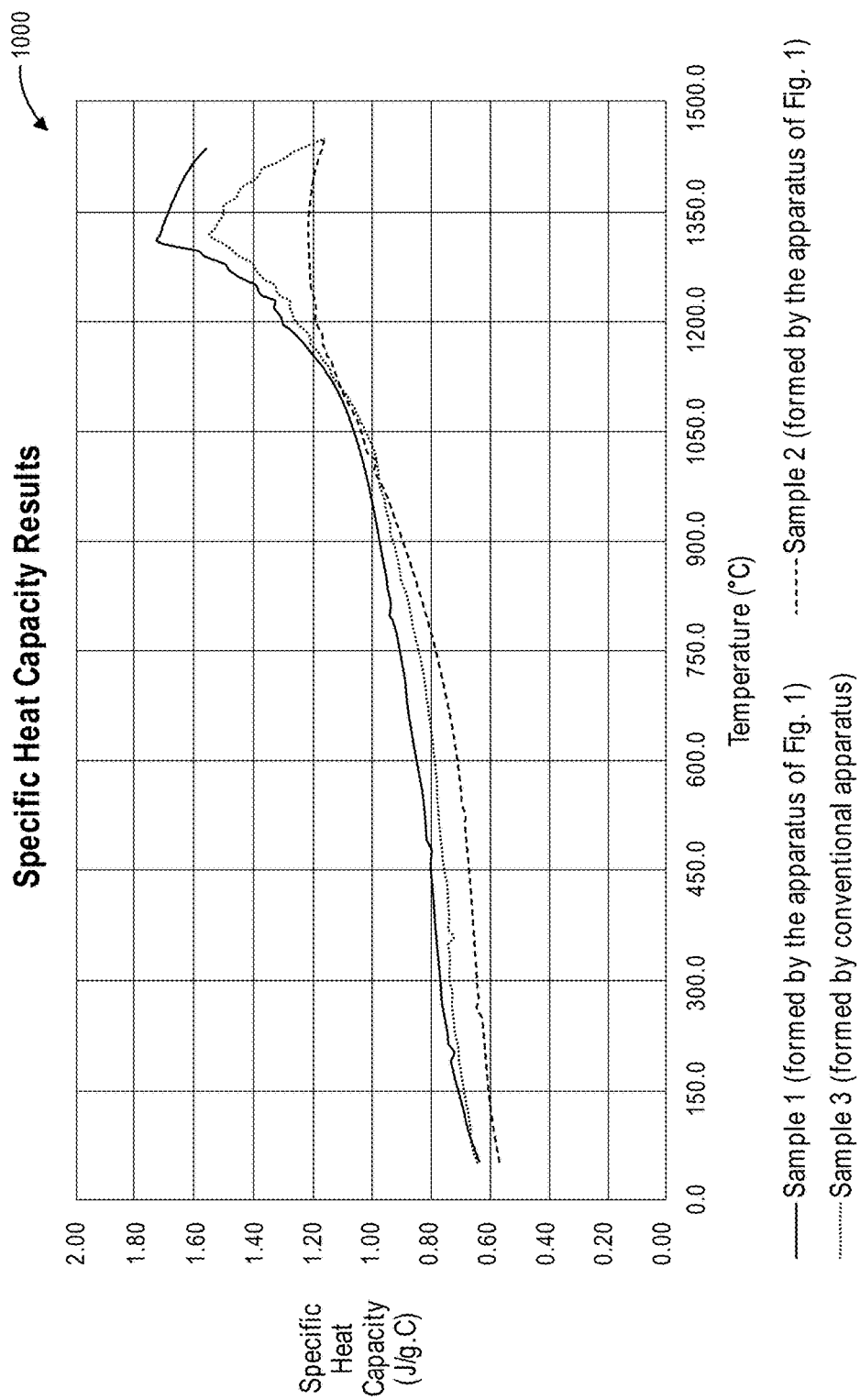
FIG. 10 is a graph showing specific heat capacity results for the three samples in FIG. 7, according to an embodiment.

FIG. 10 is a graph 1000 showing the specific heat capacity results measured for the three samples, according to an embodiment. It can be observed that the three samples show a steady increase in heat capacity from room temperature to 1250-1350° C. (2282-2462° F.), after which a decrease in heat capacity can be observed. Sample 2 can be observed to have slightly lower heat capacity when compared to the other two samples, with a peak heat capacity of about 1.20 J/g. ° C. (0.286 Btu/lb. ° F.) measured at 1350° C. (2462° F.). Sample 3 was measured to have a peak heat capacity of 1.55 J/g ° C. (0.37 Btu/lb. ° F.) at approximately 1320° C. (2404°

F.), while Sample 1 was measured to have the highest peak heat capacity among the three samples with a specific heat capacity of greater than 1.6 J/g ° C. at 1310° C. For example, the specific heat capacity was about 1.725 J/g ° C. (0.41 Btu/lb. ° F.) at 1310° C. (2390° F.). A decrease in heat capacity, as observed in all three samples, indicates an endothermic heat flow across the samples, which is an indication of partial melting or sintering of the sand grains. A good correlation can be observed between the sinter temperature and peak heat capacity temperature for the three samples.

From the expansion results, it was observed that Sample 1 showed a lower overall expansion when compared to the other two samples. However, Sample 1 started contracting at a slightly lower temperature. Samples 2 and 3 were measured to have higher overall expansion, with slightly higher contraction temperatures. These two samples were also observed to have a higher rate of contraction at the end of the test.

Sample 1 was also measured to have a slightly lower sinter temperature of 1311° C. (2392° F.) when compared to the other two samples. Sample 2 had the highest sinter temperature among the three samples, with a sinter temperature of approximately 1350° C. (2462° F.). However, Sample 1 was observed to have the highest peak viscosity at the sinter temperature when compared to the other two samples.

All three samples were observed to have a steady increase in specific heat capacity before an endothermic heat flow trend was observed at higher temperature. Sample 1 was measured to have the highest peak specific heat capacity when compared to the other two samples. Good correlation was observed between the sinter temperature and peak specific heat capacity temperature for all three samples.

Example 2

Testing was performed to evaluate the physical properties and casting quality of a sample formed by the apparatus of FIG. 1. The sample was a ceramic sand sample made using the apparatus of FIG. 1. The sample is a low density 30 GFN. The physical properties tested for the sample included tensile strength profiles at 1.35% and 1.00% resin content and a transverse strength profile at 0.80% resin content. Step-cone cores were produced from the aggregate and poured in steel, grey iron, and aluminum to evaluate the performance of the material. The tensile, transverse, and step-cone cores were produced using a commercial Phenolic Urethane Cold-Box binder system.

Tensile, transverse, and step-cone cores were prepared using a commercial Phenolic Urethane Cold-Box binder system. Tensile cores were produced at two different binder levels which were 1.35% and 1.0% based on sand weight while transverse cores were produced at 0.8% resin content based on sand. A binder content of 1.0% based on sand weight was used for step-cone cores production. A part I:part II ratio of 55:45 was used in both cases. A Redford Cold-Box machine was used for tensile and transverse cores while the step-cone cores were made in a Gaylord gassing chamber.

The sand sample was split using a 16-way sand splitter to obtain a representative grain distribution. Split sand was placed in the mixer. The Part I resin was first added to the sand and mixed for 60 seconds after which the Part II was added and mixed for a further 60 seconds. The final mixture was then placed in the respective core boxes and was gassed in the gassing chamber. A gassing pressure and a purging pressure of 20 psi (137.8 kPa) and 40 psi (275.6 kPa) respectively were used. Tensile and transverse cores were gassed for 0.5 seconds and purged for 7 seconds while step-cone cores were gassed for 5 seconds and purged for 30 seconds.

Step-cone molds were prepared using silica sand. The Bio-Urethane binder system was used for the molds. The continuous No-Bake mixer was used for mold production. Double step-cone molds with a riser were used for steel castings while single step-cone molds were used for iron and aluminum castings.

The composition of the metal used in the trials was consistent with the chemistry used to produce WCB steel, grey iron, and aluminum. For steel and iron castings, the metal was melted in a 300 lb. high-frequency, coreless induction furnace utilizing a neutral refractory lining. After meltdown, the slag was removed, a thermal analysis sample was taken, and the temperature of the molten metal was raised to approximately 3050° F. (1676° C.) for steel and 2800° F. (1537° C.) for iron. The heats were tapped into a 350 lb. heated monolithic ladle. The metal was then poured into the molds located on the pouring line using a target pouring temperature of 2900° F. (1593° C.) for steel and 2650° F. (1454° C.) for iron. An approximate total target pour time of 10 to 12 seconds was used, with each step-cone casting requiring approximately 30 lbs. of metal.

A gas fired furnace was used for aluminum castings. Molten aluminum was tapped into a hand ladle at 1450° F. (787° C.) and was poured into the molds using a target pouring temperature of 1400° F. (760° C.).

As mentioned earlier, the tensile profiles were run at two resin levels, namely 1.35% and 1.0% based on sand weight. Initially, tests were conducted at 1.35% resin content. However, after observing the tensile strengths at this resin content, further tests were run at a lower resin content of 1.0% to evaluate the tensile strengths.

Figure 11:
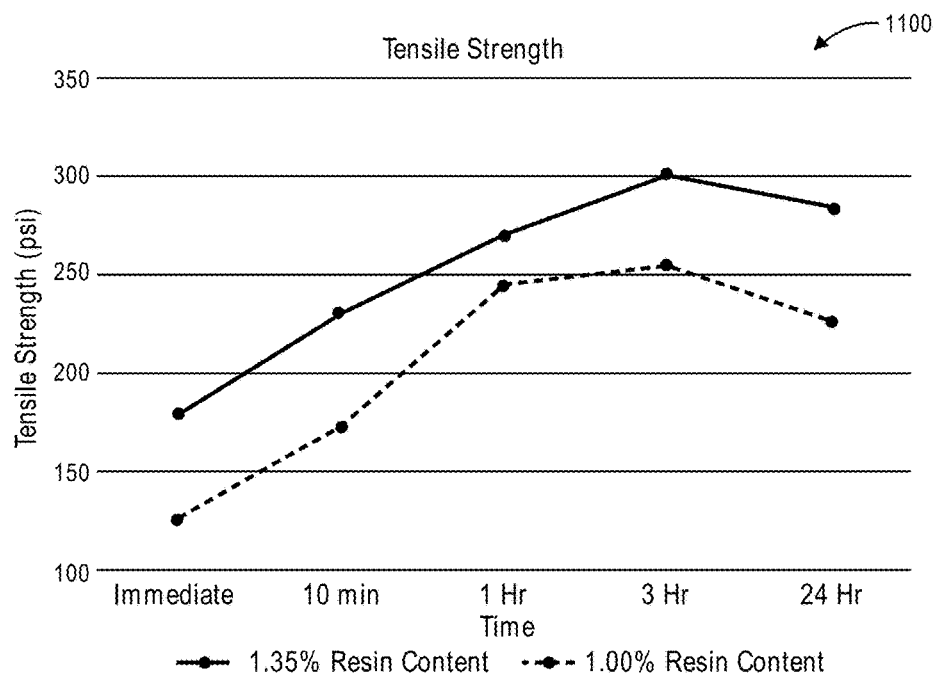
FIG. 11 is a graph showing tensile strength results at two different resin/binder levels, according to an embodiment.

FIG. 11 is a graph 1100 showing the tensile strength results at the two different resin/binder levels, according to an embodiment. It can be seen that an increase in binder content led to higher tensile strengths. The 1.35% resin content sample was observed to have tensile strengths over 200 psi from the 10 minutes-24 hour time periods, with tensile strengths close to 300 psi at 3 hours and 24 hours. The 1.0% resin content samples were tested to have strengths of about 175 psi at 10 minutes and over 200 psi at the 1 hour, 3 hour and 24 hour time periods. Strengths of ~about psi were observed at 1 and 3 hours.

Transverse strength tests were run on samples with a resin content of 0.8% resin based on sand weight. The transverse loads at failure was recorded directly from the instrument while the transverse strengths at failure was calculated from the transverse loads.

Figure 12:
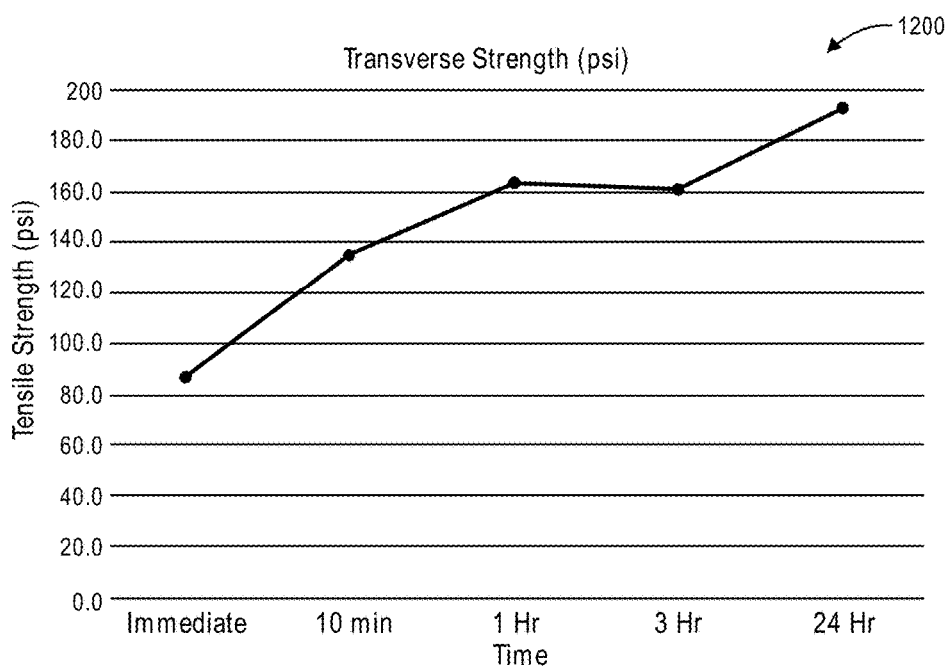
FIG. 12 is a graph showing transverse strength results, according to an embodiment.

FIG. 12 is a graph 1200 showing the transverse strength results, according to an embodiment. A large increase in transverse strength can be observed from immediate to 10 minutes. At 10 minutes, the transverse strength was recorded to be about 140 psi. At the 1 hour-24 hour time periods, the transverse strengths were observed to be about 160-190 psi.

Figure 13:
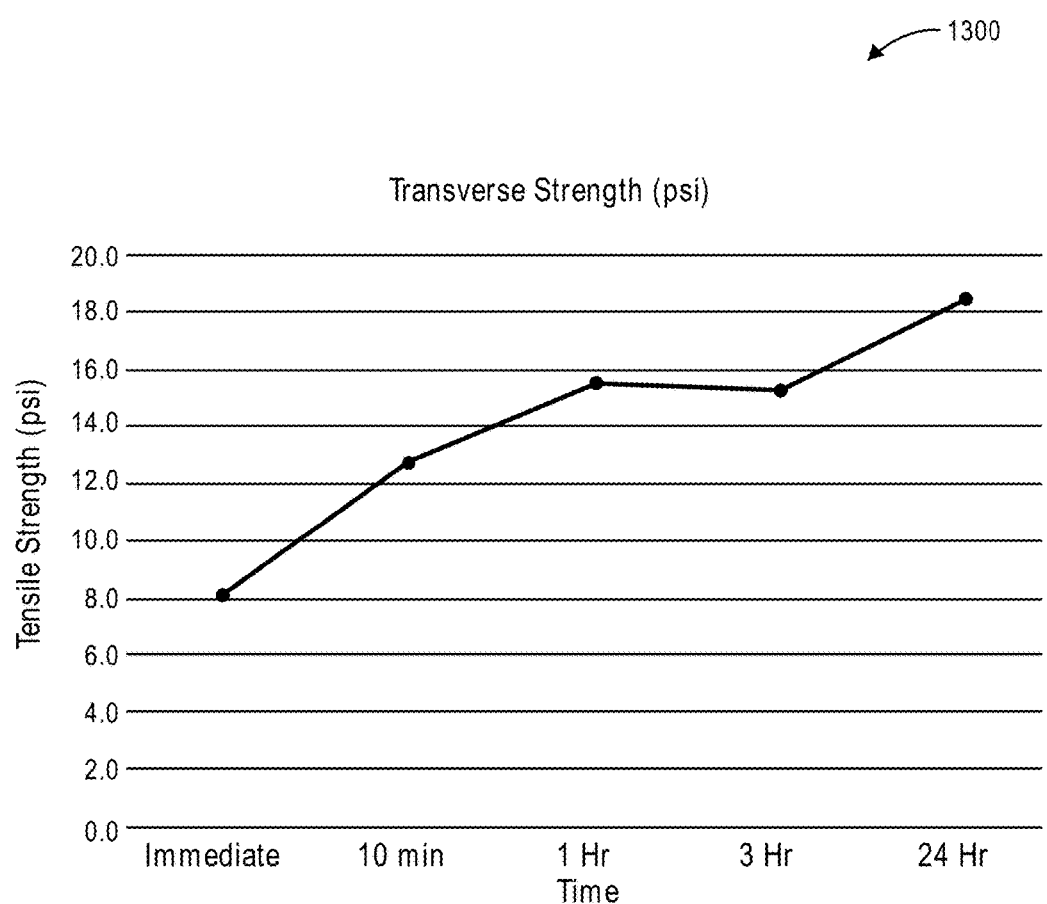
FIG. 13 is a graph showing transverse loads at failure for a sample at 0.8% resin content, according to an embodiment.

FIG. 13 is a graph 1300 showing the transverse loads at failure for a sample at 0.8% resin content, according to an embodiment. The WCB steel step-cone castings do not display any sign of veining defects. Slight penetration defects were observed in the thicker casting section. The castings were also observed to have a rough surface finish.

The grey iron step-cone castings show heavy penetration defects in the two thicker sections of the castings, that is, the 3.5 in. and the 4 in. step. Additionally, slight penetration defects were observed in the 3 inch casting step. No veining defects were observed in the castings. The grey iron castings showed better surface finish results when compared to the steel castings. The aluminum step-cone castings showed no veining or penetration defects were observed in the castings.

Good tensile strengths were observed for the sample at both 1.35% and 1.00% resin content. At 1.00% resin content, strengths of approximately 250 psi were measured at 1 hour and 3 hours.

A similar trend was observed in the transverse strength results. Transverse strengths were measured to be about 160 psi at 1 hour and 3 hours. However, after 3 hours, the transverse strength of the samples increased to about 190 psi.

No veining defects were observed in the step-cone castings poured out of aluminum, grey iron, and steel. The aluminum castings did not display penetration defects. The steel castings showed slight penetration defects at the thickest section of the casting while heavy penetration defects were observed in the grey iron castings at the thicker sections. The steel castings were observed to have a rough surface finish when compared to the other two alloys.

Example 3

Trials were conducted to characterize four ceramic aggregate samples for their green sand properties. Sodium bentonite clay at 7.5% clay content was used for all green sand mixtures. Additionally, a 55 GFN silica sand was tested as a baseline sample. The results of the ceramic samples were compared to the silica sand. The samples were:
  Sample 1 (formed by a conventional apparatus) Carbo Accucast ID50
  Sample 2 (formed by a conventional apparatus) Carbo Accucast LD45
  Sample 3 (formed by the apparatus of FIG. 1) Carbo Kryptocast LD30
  Sample 4 (formed by the apparatus of FIG. 1) Carbo Kryptocast HD20
  Sample 5 (55 GFN silica sand)

Sample 1 is an intermediate density 50 GFN made from a kaolin-bauxite blend. Sample 2 is a low density 45 GFN made from kaolin. Sample 3 is a low density 30 GFN made from kaolin. Sample 4 is a high density 20 GFN made from bauxite.

The samples were initially tested with a mull down test, to evaluate the relative speed of bond development. The materials were added in corrected proportions, mulled for 10 minutes and moisture corrections were made to obtain a compactability in the range of 42±2. Green compression strengths and moisture contents were measured for the five green sand mixtures, following which the sand was returned to the muller and tested for twelve further cycles, using a mull time of 5 minutes. Available clay, effective clay, and mulling efficiency were calculated for the mixtures over the thirteen total cycles, including the initial cycle at 10 minutes and twelve cycles at 5 minutes. At the end of the final cycle, the five green sand mixtures were further evaluated for baseline green properties, including:
  Green compression strength
  Green shear strength
  Dry compression strength
  Dry shear strength
  Wet tensile strength
  Mold Hardness
  Methylene Blue Clay
  Loss on Ignition
  Bulk Density
  Permeability
  Moisture
  Compactability Additionally, thermal expansion tests were conducted using a high-temperature aggregate dilatometer to measure the expansion characteristics, surface viscosity, and sinter temperature of the five green sand mixtures.

A Simpson 50 lbs. batch muller was used to prepare the green sand. 100% sodium bentonite clay was used to prepare all mixtures. The green sand mixtures were prepared with a target clay content of 9%. Methylene blue clay tests were run to verify the clay content. The mulling cycles consisted of an initial 10-minute cycle, as part of the Mull down tests. The aggregate was initially added to the muller, followed by the clay and temper water. The mixture was mulled for 10 minutes. The green sand was then tested for compactability, with a target compactability of 42±2. Additional water was added, if required, to increase the compactability. When the target compactability was achieved, samples were taken for green compression and moisture testing. This process was repeated for twelve further 5-minute cycles. At the end of the final cycle, samples were taken for baseline green sand properties testing. A small sample was saved for thermal expansion testing.

Available clay, effective clay, and muller efficiency were calculated over the mull down cycles. The formulae used for calculation are shown in equations 1-3.

$$\text{Available Clay}(\%) = (0.105/GCS) + (1.316 \times MOIST) \quad \text{Equation 1}$$

$$\text{Effective Clay}(\%) = (15.29 \times GCS)/(132.1 - COMP) \quad \text{Equation 2}$$

$$\text{Muller Efficiency}(\%) = 100 \times (\text{Effective Clay})/(\text{Available Clay}) \quad \text{Equation 3}$$

Where GCS is the green compression strength, MOIST is the moisture content, and COMP is the compactability.

All the tests conducted for characterizing the five green sand mixtures followed AFS standards. 2"×2" cylindrical specimens were prepared for the tests. A Simpson Universal Strength test was used for determining green compression, green shear, dry compression, and dry shear strengths. A Simpson wet tensile test was used to determine the wet tensile strengths for the four mixtures. A temperature of 310° C. and 20 s was used for the wet tensile strength tests. A digital moisture teller was used to determine the moisture content. A Simpson digital absolute permmeter was used to measure the permeability. A Simpson electronic B-scale mold hardness tester was used to measure the mold hardness.

Thermal expansion tests were run on the green sand samples utilizing the university's high temperature aggregate dilatometer. The cylindrical expansion cores had a height of approximately 1.6 inches (4.06 cm) and a diameter of 1.1 inches (2.8 cm). The samples were heated to 1600° C. (2912° F.) using two heating rates. The samples were first heated to 125° C. (257° F.) using a heating rate of 2 C per minute. This was followed by a heating rate of 10° C. per minute to the end of the test. The resulting deformation was recorded and was used to calculate the surface viscosity of the aggregates.

Figure 14:
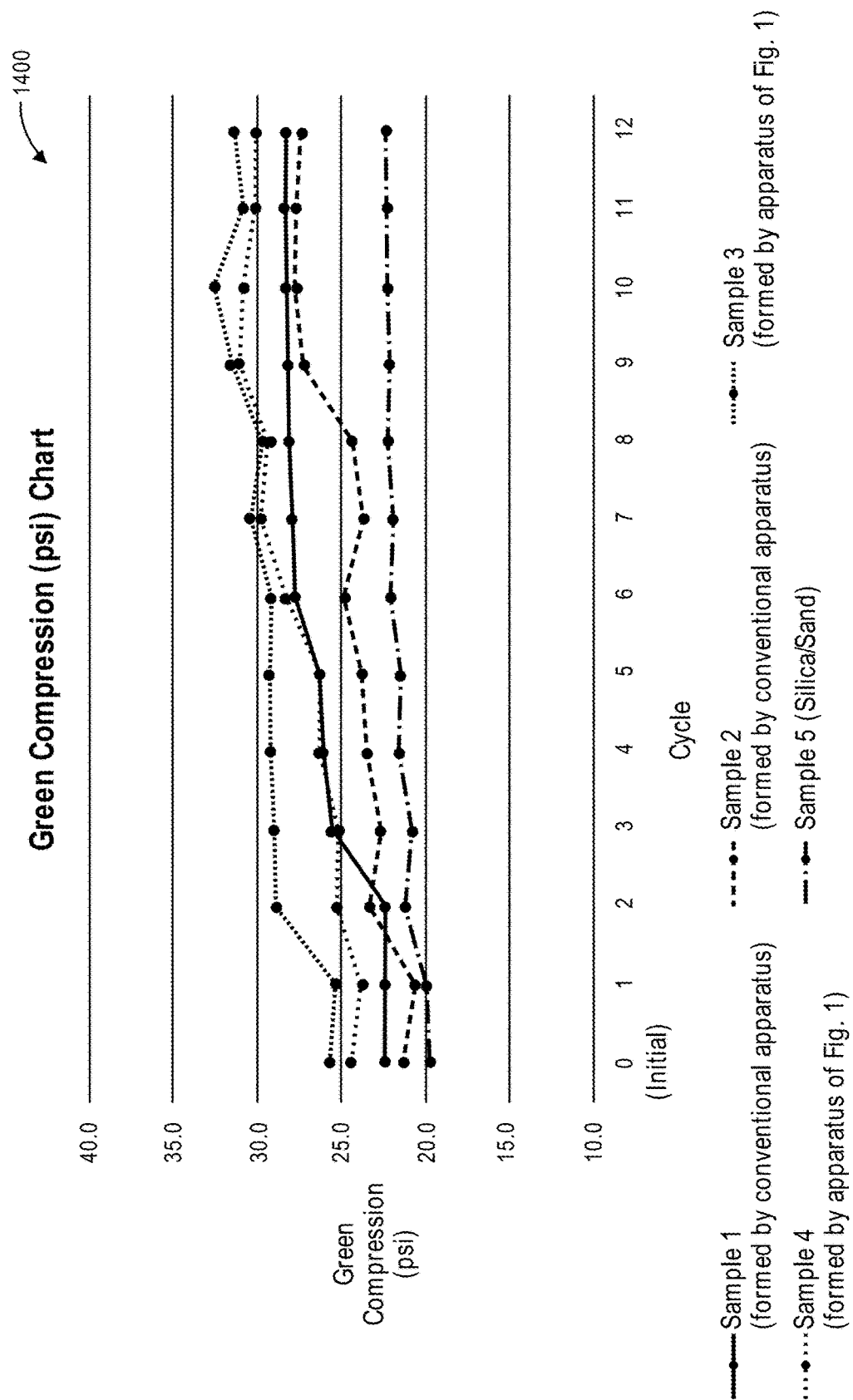
FIG. 14 is a graph showing the green compression strength results for five samples over 12 cycles, according to an embodiment.

FIG. 14 is a graph 1400 showing the green compression strength results for the five samples over 12 cycles, according to an embodiment. All samples had lower strengths initially when compared to later cycles. Sample 1 was observed to have steady strengths of about 28 psi from cycle 6 while the other three samples were observed to have steady strengths from cycle 8 onwards. This shows that Sample 1 had a slightly faster rate of bond development when compared to the other samples. Additionally, it can be seen that Samples 3 and 4 displayed slightly higher strengths when compared to Samples 1 and 2, with strengths in the range of 30-31 psi. Sample 5 can be observed to have a faster rate of bond development when compared to the other samples, with steady strengths observed from cycle 2 onwards. However, the green compression strengths were comparatively lower when compared to the ceramics, with strengths of 21-22 psi measured after cycle 2.

Figure 15:
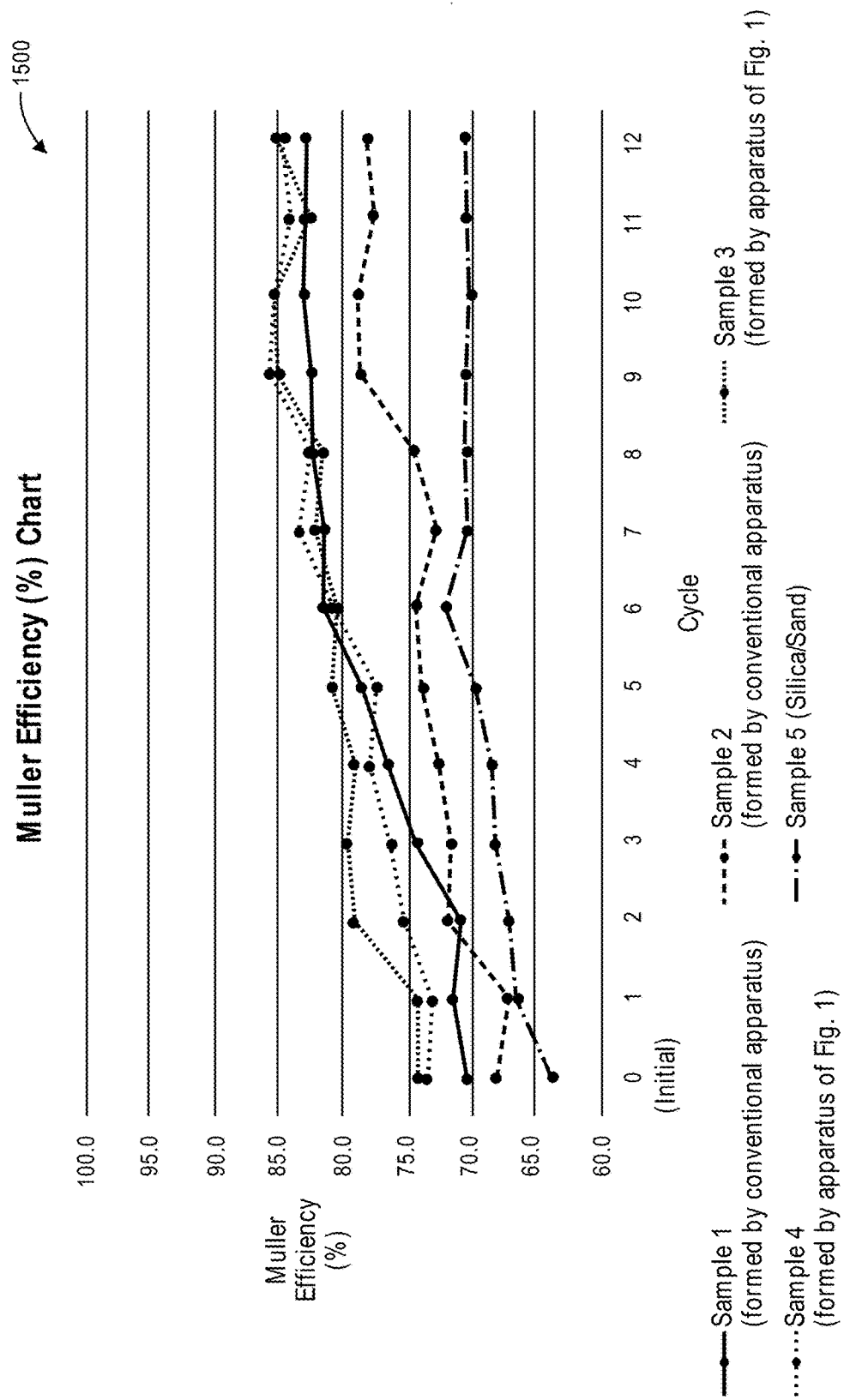
FIG. 15 is a graph showing muller efficiency results from mull down testing for the five samples, according to an embodiment.
Figure 16:
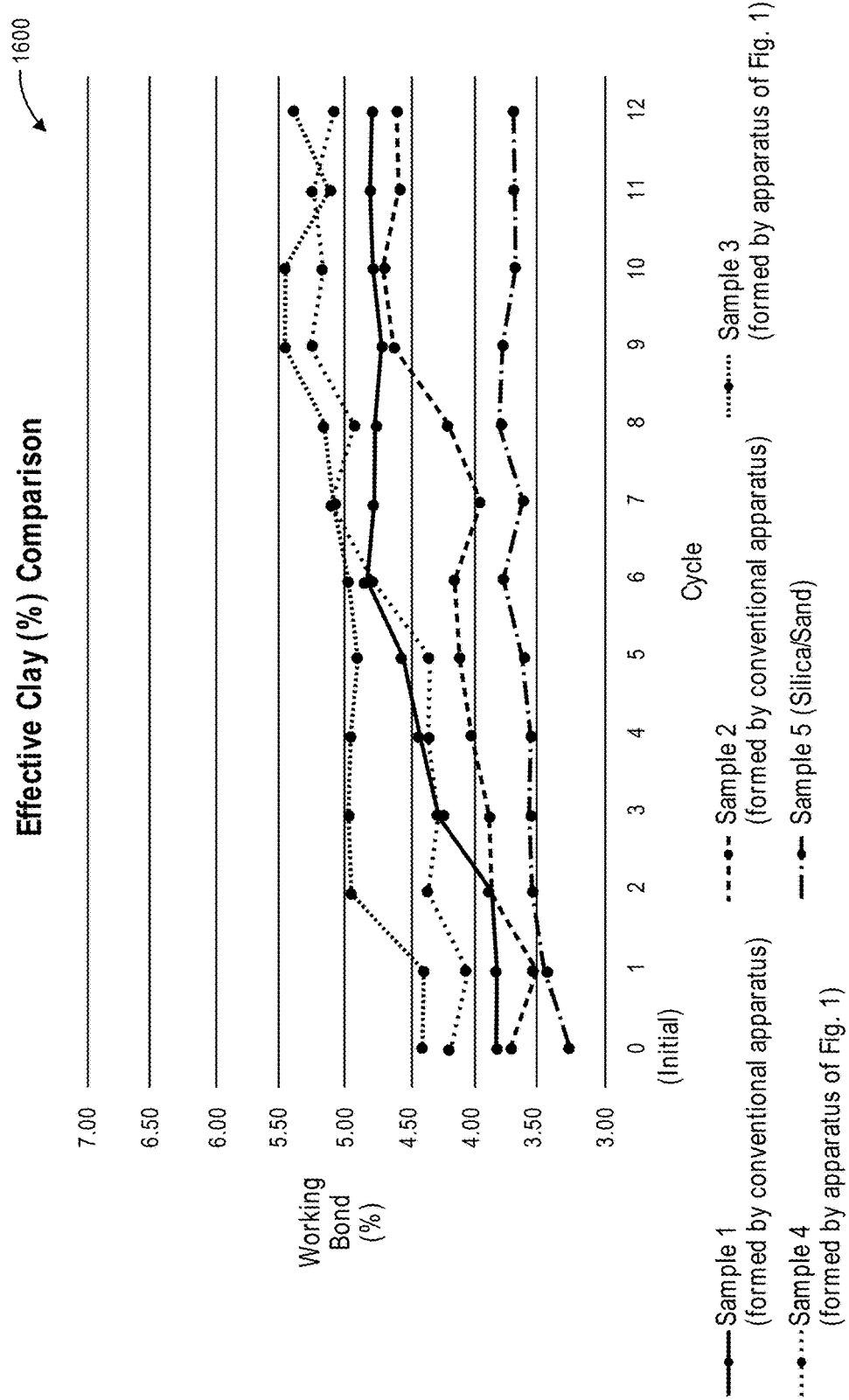
FIG. 16 is a graph showing effective clay content results over twelve cycles for the five samples, according to an embodiment.

FIG. 15 is a graph 1500 showing the muller efficiency results from mull down testing for the five sample aggregates, according to an embodiment. All five samples were calculated to have muller efficiencies of over 60%. Samples 3 and 4 were again to have slightly higher muller efficiency (e.g., greater than 84%), especially during the initial cycles. Samples 2 and 5 can be observed to have lower muller efficiency when compared to the other samples, ranging from 68%-78%. These samples were calculated to have similar muller efficiencies. FIG. 16 is a graph 1600 showing the effective clay content results over twelve cycles for the five sample aggregates, according to an embodiment.

Table 4 shows the green compression, green shear, dry compression, dry shear, and wet tensile strengths measured for the five green sand mixtures.

TABLE 4

| Sample | Green Compression Strength (psi) | Dry Compression Strength (psi) | Green Shear Strength (psi) | Dry Shear Strength (psi) | Wet Tensile Strength (psi) |
|---|---|---|---|---|---|
| Sample 1 | 28.307 | 43.770 | 6.650 | 12.557 | 0.307 |
| Sample 2 | 27.447 | 45.700 | 6.250 | 12.600 | 0.336 |
| Sample 3 | 31.433 | 54.663 | 7.517 | 13.133 | 0.446 |
| Sample 4 | 30.060 | 55.970 | 7.333 | 12.850 | 0.443 |
| Sample 5 | 22.573 | 46.623 | 7.250 | 13.503 | 0.465 |

It can be observed that Samples 1 and 2 show similar strengths. With the exception of dry shear strength, Samples 3 and 4 were measured to have higher green and dry strengths when compared to Samples 1 and 2. Sample 5 can be observed to have significantly lower green compression strengths when compared to the other samples. All samples showed similar dry shear strengths ranging from 12.55-13.5 psi. Additionally, the dry strengths were observed to be higher for all samples when compared to their green states, which is typical of a sodium bentonite clay. Samples 3-5 were also measured to have higher wet tensile strengths when compared to Samples 1 and 2, which is the tensile strength measured at a green sand mixture's condensation zone or wet layer where lower strengths are typically observed.

TABLE 5

| Sample | Loss on Ignition (%) | AFS Permeability |
|---|---|---|
| Sample 1 | 0.872 | 411.33 |
| Sample 2 | 0.908 | 451.00 |
| Sample 3 | 0.900 | 918.67 |
| Sample 4 | 0.847 | — |
| Sample 5 | 0.933 | 185.667 |

The loss on ignition and AFS permeability results for the four mixtures are shown in Table 5. All samples were measured to have similar loss on ignition content, ranging from 0.847% to 0.933%. Samples 1 and 2 were measured to have similar AFS permeability results. It can be observed that Sample 3 has a higher permeability (e.g., greater than 500) when compared to Samples 1 and 2, with a measured permeability of 918.67. The permeability of Sample 4 was beyond the range of the Simpson permmeter and could not be measured. Comparatively, the silica sample can be observed to have lower permeability, measured at 185.667.

TABLE 6

| Sample | Mold Hardness (B scale) | M.B. Clay (%) |
|---|---|---|
| Sample 1 | 76.667 | 9.460 |
| Sample 2 | 92.000 | 7.373 |
| Sample 3 | 95.667 | 7.467 |
| Sample 4 | 92.667 | 7.373 |
| Sample 5 | 91.000 | 7.513 |

Table 6 shows the mold hardness and methylene blue clay results for the green sand mixtures. As mentioned earlier, the methylene blue clay test was conducted to verify the clay content in the mixtures. Samples 2-5 were measured to have higher mold hardness, in the range of 91-95.6, when compared to Sample 1, which was measured to have a mold hardness of approximately 77 on the B scale. Sample 3 had a mold hardness of greater than 93 on the B scale.

TABLE 7

| Sample | Sample Weight (g) | Bulk Density (lbs./ft$^3$) | Compactability (%) |
|---|---|---|---|
| Sample 1 | 182.7 | 111.068 | 42 |
| Sample 2 | 152.1 | 91.703 | 41 |
| Sample 3 | 158.9 | 96.364 | 43 |
| Sample 4 | 195.4 | 117.996 | 42 |
| Sample5 | 154.5 | 93.411 | 40 |

The average sample weight, bulk density, and compactability results for all samples are shown in Table 7. As mentioned, the green sand properties shown in Tables 4-6 were measured at a compactability range of 42±2. The sample weights of the 2"×2" specimen were measured. It can be seen that Samples 2 and 5 have similar sample weights, while Sample 3 was recorded to have a higher average sample weight when compared to Sample 2. Sample 4 was recorded to have higher sample weights when compared to the other samples, with 195.4 grams required to produce a 2"×2" specimen. The calculated average bulk density for all samples are shown in the table.

Figure 17:
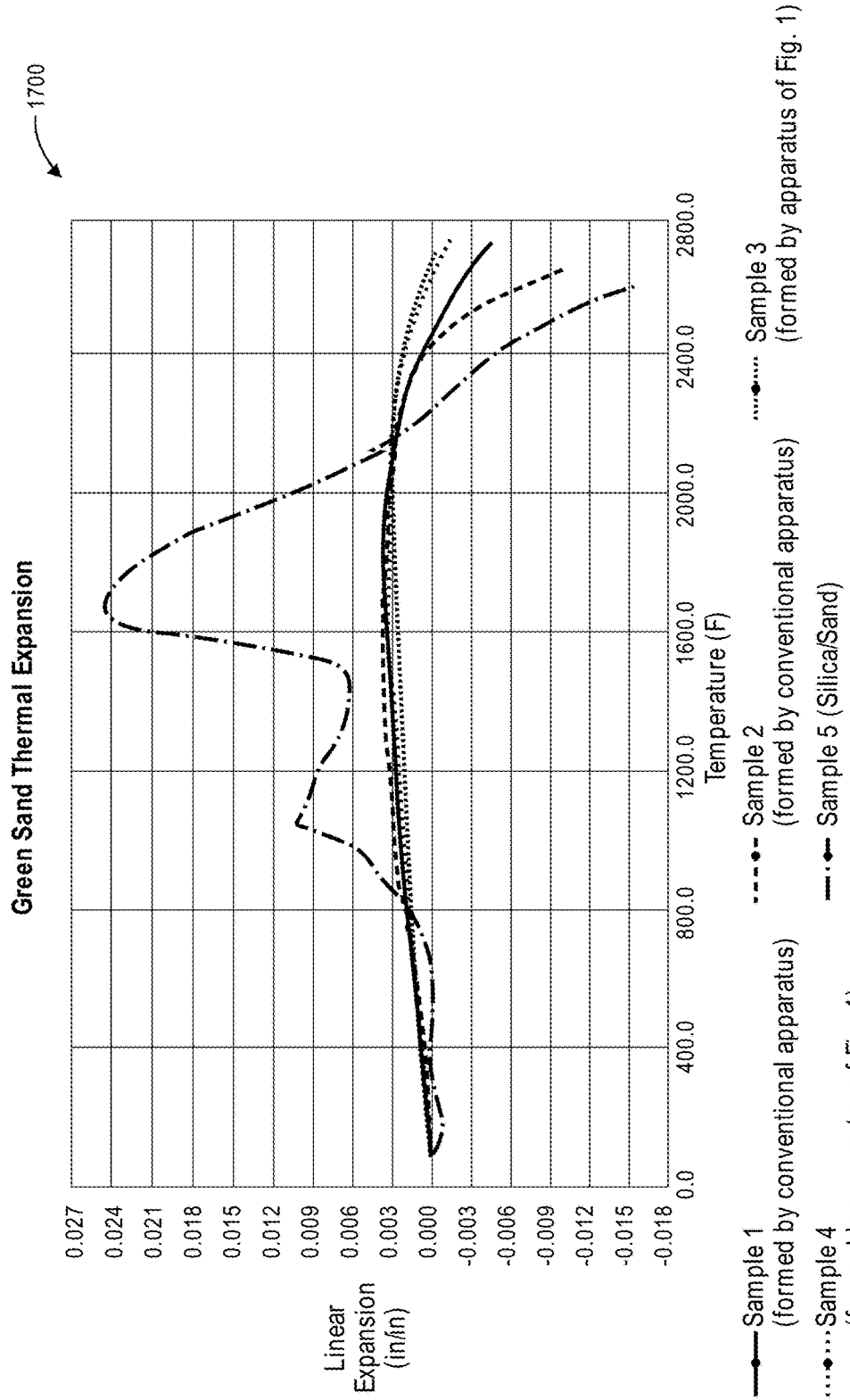
FIG. 17 is a graph showing thermal expansion results for the five samples, according to an embodiment.

FIG. 17 is a graph 1700 showing the thermal expansion results for the five green sand samples, according to an embodiment. All the ceramic samples were observed to have a steady linear expansion before a contraction at higher temperature. Samples 1 and 2 were observed to start the contraction at approximately 2200-2300° F. Samples 3 and 4 had a similar contraction start temperature. However, it can be observed that these samples had a slower rate of contraction at the measured temperature range when compared to Samples 1 and 2, specifically Sample 2, which was measured to have a sharp contraction. Sample 5 can be observed to have a large expansion initially leading to the alpha-beta phase transformation at 1063° F. A contraction was observed after this transformation until about 1480° F., where a rapid secondary expansion can be observed. This secondary expansion is due to the presence of sodium in the mixture, which leads to a tridymite phase transformation of silica. After this secondary expansion, a steep contraction can be observed in the silica sample.

Figure 18:
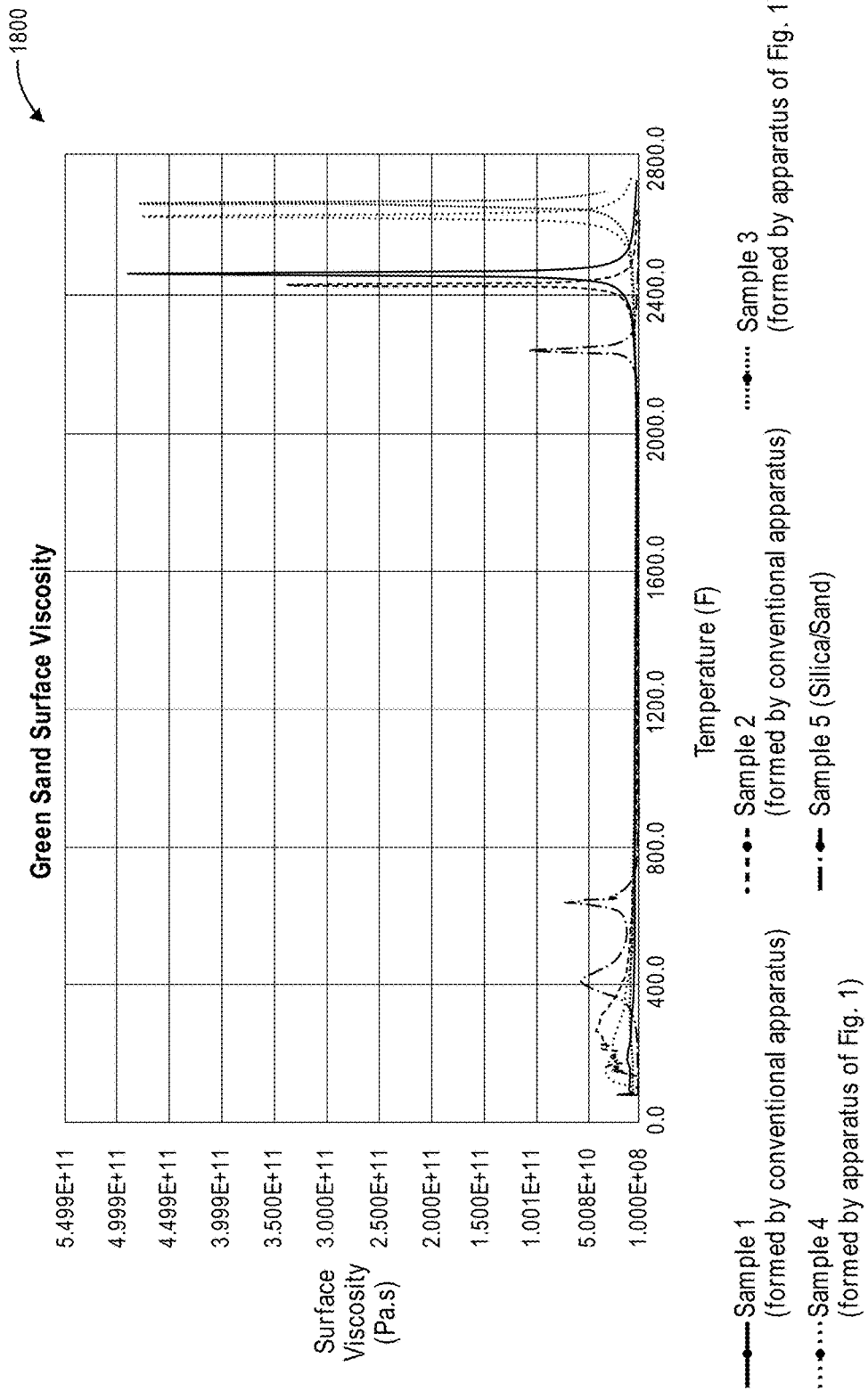
FIG. 18 shows surface viscosity results for the five samples, according to an embodiment.

FIG. 18 is a graph 1800 showing the surface viscosity results for the five samples, according to an embodiment. All samples were measured to have an initial increase in viscosity. After this point, steady viscosity can be observed for all samples leading to the sinter point of the samples at higher temperature. At the sinter temperature, a sharp increase in viscosity can be seen for the samples. The sinter temperatures of Samples 1 and 2 were measured to be 2456° F. and 2425° F. respectively. Samples 3 and 4 had comparatively higher sinter temperatures, with measured temperatures of greater than 2500° F. (e.g., 2623° F. and 2661° F., respectively). Comparatively, Sample 5 was measured to have a lower sinter temperature of 2237° F.

All samples were calculated to have muller efficiencies of over 60%, displaying good performance. Samples 3 and 5 showed higher green compression strengths and muller efficiency when compared to Samples 1 and 2. When compared to Sample 5 (i.e., the baseline sample), all samples were observed to have higher green compression strengths over the 12 cycles.

A similar trend was observed in the baseline strength tests. With the exception of dry shear strengths, Samples 3 and 4 were determined to have higher strengths when compared to Samples 1 and 2. Samples 1-4 were observed to have higher green compression strengths than Sample 5. Sample 3 was also measured to have a higher permeability when compared to Samples 1 and 2. The permeability of Sample 4 was over the range of the instrument. The permeability of Sample 5 was comparatively lower, at approximately 185. With the exception of Sample 1, the other four samples showed mold hardness in the range of 91-95, measured in the B scale. Sample 1 was measured to have a mold hardness of approximately 77.

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

What is claimed is:

1. A foundry media pellet, comprising:
   a sintered ceramic material having:
      a size from about 10 AFS GFN to about 110 AFS GFN;
      a thermal expansion of less than 0.003 in/in at 1200° C.; and
      a surface roughness of less than about 4 microns; and
   a resin coated onto the surface of the sintered ceramic material, the resin present in an amount of 0.8% to about 1.35% based on the weight of the foundry media pellet.

2. The foundry media pellet of claim 1, wherein the sintered ceramic material has an average largest pore size of less than about 10 microns.

3. The foundry media pellet of claim 1, wherein the size is from about 30 AFS GFN to about 80 AFS GFN.

4. The foundry media pellet of claim 1, wherein the sintered ceramic material has a thermal expansion of less than 0.002 in/in at 1200° C., at 1400° C., or at both temperatures.

5. The foundry media pellet of claim 1, wherein the resin comprises a phenolic resin and a mold formed from a plurality of the foundry media pellet has a transverse strength from about 160 psi to about 190 psi.

6. The foundry media pellet of claim 1, wherein a surface viscosity of the sintered ceramic material has a first peak that is greater than $4.01 \times 10^{10}$ Pa*s at less than 1200° C. and a second peak that is greater than $4.01 \times 10^{10}$ Pa*s between about 1250° C. and about 1350° C.

7. The foundry media pellet of claim 1, wherein the sintered ceramic material has a specific heat capacity of greater than 1.6 J/g ° C. at 1310° C.

8. The foundry media pellet of claim 1, wherein the sintered ceramic material has a green compression strength that is greater than 30 psi.

9. The foundry media pellet of claim 1, wherein the sintered ceramic material has a dry compression strength that is greater than 50 psi.

10. The foundry media pellet of claim 1, wherein the sintered ceramic material has a green shear strength of greater than 7.3 psi.

11. The foundry media pellet of claim 1, wherein the sintered ceramic material has a muller efficiency of greater than 84%.

12. The foundry media pellet of claim 1, wherein the sintered ceramic material has an AFP permeability of greater than 500.

13. The foundry media pellet of claim 1, wherein the sintered ceramic material has a mold hardness of greater than 93 on the B scale.

14. The foundry media pellet of claim 1, wherein the sintered ceramic material has a sinter temperature that is greater than 2500° F.

15. A method for forming a foundry media pellet, comprising:
   causing a slurry to flow through one or more nozzles that separate the slurry into a plurality of droplets, wherein the droplets of the slurry fall into a liquid and react with the liquid to form green pellets;
   sintering the green pellets to provide sintered pellets;
   coating the sintered pellets with a resin to provide a plurality of the foundry media pellet of claim 1; and
   forming the foundry media pellets into a mold that has a transverse strength from about 160 psi to about 190 psi.

16. The method of claim 15, wherein the resin comprises a phenolic resin, wherein the mold comprises a casting mold.

17. The method of claim 16, further comprising casting molten metal into the casting mold.

18. The method of claim 15, further comprising blending the pellets with clay before forming the pellets into the mold, wherein the mold comprises a green sand mold.

19. The method of claim 15, wherein the slurry comprises a reactant comprising a polysaccharide, and wherein the slurry has a solids content from about 15 wt % to about 65 wt %.

20. The method of claim 15, wherein the slurry flows through the one or more nozzles at a rate of about 1 kg/(mm²×hr) to about 15 kg/(mm²×hr), and wherein the slurry comprises a coagulation agent that reacts with the liquid to cause gelling of the reactant in the droplets of the slurry.

* * * * *